(12) United States Patent
Duke

(10) Patent No.: US 9,103,333 B2
(45) Date of Patent: Aug. 11, 2015

(54) AXIAL PISTON MACHINES

(75) Inventor: Noel Stephen Duke, Auckland (NZ)

(73) Assignee: DUKE ENGINES LIMITED, Auckland (NZ)

( * ) Notice: Subject to any disclaimer, the term of this patent is extended or adjusted under 35 U.S.C. 154(b) by 704 days.

(21) Appl. No.: 13/376,699

(22) PCT Filed: Oct. 25, 2011

(86) PCT No.: PCT/IB2011/054745
§ 371 (c)(1),
(2), (4) Date: Apr. 5, 2012

(87) PCT Pub. No.: WO2012/056392
PCT Pub. Date: May 3, 2012

(65) Prior Publication Data
US 2012/0180650 A1   Jul. 19, 2012

Related U.S. Application Data

(60) Provisional application No. 61/406,767, filed on Oct. 26, 2010.

(51) Int. Cl.
*F04B 1/12* (2006.01)
*F04B 27/08* (2006.01)
(Continued)

(52) U.S. Cl.
CPC ........... *F04B 27/0895* (2013.01); *F01B 3/0005* (2013.01); *F01B 3/0035* (2013.01); *F01B 7/04* (2013.01); *F01B 9/02* (2013.01); *F02B 75/26* (2013.01); *F02B 75/282* (2013.01); *F02B 75/32* (2013.01); *F03C 1/0631* (2013.01); *F03C 1/0673* (2013.01); *F04B 1/146* (2013.01); *F04B 1/2092* (2013.01); *F04B 27/0869* (2013.01);

(Continued)

(58) Field of Classification Search
CPC .... F03C 1/0673; F03C 1/0631; F04B 1/2092; F04B 27/0869; F04B 27/1054; F04B 27/1063; F04B 1/146; F04B 27/0895; F01B 3/0005; F01B 3/0035; F01B 7/04; F01B 9/02; F01B 75/26; F01B 75/282; F01B 75/32
USPC ................ 92/57, 71; 91/499; 417/269; 74/60
See application file for complete search history.

(56) References Cited

U.S. PATENT DOCUMENTS 1,948,827 A    2/1934   Redrup
2,917,931 A   12/1959   Sherman
(Continued)

FOREIGN PATENT DOCUMENTS

GB   1 020 436   2/1966
RU   2316661     2/2008
(Continued)

*Primary Examiner* — Dwayne J White
*Assistant Examiner* — Logan Kraft
(74) *Attorney, Agent, or Firm* — Jacobson Holman, PLLC.

(57) ABSTRACT

The invention relates to an axial piston machine of a kind that has a plurality of pistons each reciprocating in a respective cylinder in a direction substantially parallel or at an angle less than 30 degrees to a crankshaft axis. The crankshaft axis presents a crank that is at an angle to the crankshaft axis and to which a reciprocator is mounted. The reciprocator effects the controlled movement of the pistons in their cylinders via a connection mechanism that connects each said piston with said reciprocator. The machine includes at least one pair of rotational constraint mechanisms to constrain the movement between the reciprocator and the pistons.

33 Claims, 27 Drawing Sheets

(51) Int. Cl.
*F04B 1/20* (2006.01)
*F03C 1/06* (2006.01)
*F01B 3/00* (2006.01)
*F01B 7/04* (2006.01)
*F01B 9/02* (2006.01)
*F02B 75/26* (2006.01)
*F02B 75/28* (2006.01)
*F02B 75/32* (2006.01)
*F04B 1/14* (2006.01)
*F04B 27/10* (2006.01)
*F16H 23/08* (2006.01)

(52) U.S. Cl.
CPC ......... *F04B 27/1054* (2013.01); *F04B 27/1063* (2013.01); *F16H 23/08* (2013.01)

(56) References Cited

U.S. PATENT DOCUMENTS

| | | | |
|---|---|---|---|
| 4,106,354 A * | 8/1978 | Girodin | ............................ 74/60 |
| 4,235,116 A | 11/1980 | Meijer | |
| 4,776,259 A | 10/1988 | Takai | |
| 5,109,754 A | 5/1992 | Shaw | |
| 6,968,751 B2 | 11/2005 | Shulenberger | |
| 7,117,828 B2 | 10/2006 | Shuttleworth | |

FOREIGN PATENT DOCUMENTS

| | | |
|---|---|---|
| WO | 98/59160 | 12/1998 |
| WO | 2009/022917 | 2/2009 |

* cited by examiner

AXIAL PISTON MACHINES

This is a national stage of PCT/IB2011/054745 filed Oct. 25, 2011 and published in English, claiming benefit of U.S. provisional application No. 61/406,767, filed Oct. 26, 2010, hereby incorporated by reference.

FIELD OF INVENTION

This invention broadly relates to improvements in or relating to an axial piston machine, including but not limited to engines, fluid pumps and motors. In particular, although not solely, this invention relates to indexing and/or synchronising mechanisms for axial piston machines such as two or four-stroke axial piston internal combustion engines and pumps and motors in general. More specifically but not solely, it relates to the configuration of indexing and/or synchronising mechanisms in axial piston machines suitable for operation at relatively high speeds and/or better capable of dealing with internal mechanical load transfer.

BACKGROUND

An axial piston machine is a machine in which a plurality of axially extending cylinders, together comprising the cylinder cluster, are arranged in a generally rotationally symmetrical layout around a central axis coincident with the rotational axis of a crankshaft. Each cylinder has an axis parallel or slightly inclined to that of the other cylinders. Each cylinder contains a reciprocating piston that may reciprocate along the cylinder axis. Axial piston machines may offer a number of potential advantages over other multi-cylinder piston machine configurations including: reductions in size and weight, simplified fluid porting, and the ability to achieve close to perfect balancing of the dynamic inertial forces.

There are a number of different mechanisms that can be used to drive the reciprocating motion of the pistons in their cylinders, two of the most common types being swashplate drives and wobbleplate or Z-Crank drives. While terminology can vary, a swashplate is in effect a cam surface attached to and rotating with the crankshaft that drives or is driven by the reciprocating linear motion of the pistons. Each piston has a bearing or bearings attached to it that slides or rolls over the surface of the swashplate cam surface. Each piston also has some form of linear bearing such as the side of the piston within its cylinder that re-acts the lateral forces created by the action of the piston-driving bearings when on the inclined surface of the swashplate. Piston-swashplate bearings will generally have a high sliding or rolling speed over the swashplate, which is proportional to engine rotation speed and radius from rotational axis. While this arrangement is adequate for axial piston machines having relatively low piston speeds such as compressors and hydraulic pumps or motors, modern internal combustion engines commonly have much higher piston reciprocity speeds, and the high inertial loads and bearing sliding or rolling speeds in a swashplate drive operating with high piston speeds can lead to high frictional losses that make swash plate drives less attractive for internal combustion engines. Z-Crank drives employ an intermediate body known variously as a wobbleplate, reciprocator or spider that rotates on bearings mounted on a crank section inclined to and intersecting with the crankshaft's rotational axis at an acute angle hereinafter referred to as the "crank angle" at a point hereinafter referred to as "point X". The reciprocator is restrained against rotation with respect to the cylinder cluster by a torque restraint mechanism that may be implemented using a variety of mechanisms so that the rotation of the inclined crank causes the reciprocator to nutate or vice versa. The torque restraint mechanism thereby synchronising the reciprocator rotation with the cylinder clusters rotation. U.S. Pat. No. 4,235,116 describes such a mechanism. So does WO9859160.

The radial distance from point X to the point where features of the reciprocator are provided for rotation constraint, remain fixed.

The connection between the reciprocator and pistons can take many forms but generally connection rods having joints with two or more rotational degrees of freedom are utilised at both ends to connect to the piston and the reciprocator respectively. WO9859160 shows an example.

In a typical Z-crank drive configuration it is common that the connection rods (con-rods) are connected by joints with multiple degrees of freedom to both the piston and the reciprocator, the big end connection being where the connection rods connect to the reciprocator. The connection rods preferably take peak loads when the connection rods are substantially parallel to the cylinder axis. This reduces significant side loading of the piston onto the cylinder wall.

The radial distance from point X to each big end connection point remains fixed. Prior art Z-crank engine arrangements are known where the cylinder cluster rotates relative to the stationary engine housing. An example is described in WO9859160. This type of engine requires an indexing mechanism to index the rotation of the cylinder cluster relative to the ports. In WO9859160 the indexing is achieved by bevelled gears. Synchronisation is also achieved by bevelled gear.

As described in WO9859160, the synchronisation bevelled gear carried by the reciprocator operates at a distance from point X that is fixed and that is substantially smaller than the distance from point X to the big end connection point of each connection rod. One of the disadvantages of this position of the synchronisation bevelled gears is that the pitch line forces of the teeth in contact are high and the torsional stiffness is low due to the torque being reacted at a relatively small radius.

As shown in FIG. 1, a further disadvantage is that due to the gears 1000, meshing on a median MA line, the reciprocator 9A may need to be configured around the gear positioning in order to place the big end connection on the equatorial plane EA. This can result in the load transfers of the input forces (by the piston 11A) via the con-rods 12A being transferred via the reciprocator 9A in less direct paths and increased stress on or masses of the reciprocator structure.

A solution to these problems is to make the diameter of the bevelled gear bigger. This is described in FIG. 5b of U.S. Pat. No. 7,117,828 where its diameter is such as to place the bevelled gear around the outside of the connection rods. But a disadvantage of this is that the overall size of the engine increases. This adds mass at relatively large radius and therefore substantial inertia.

Described in FIG. 4 of U.S. Pat. No. 5,109,754 is the use of a bevelled gear placed close to the location of the big end connection.

In such a configuration, the bevelled gears (needing to meet at a median line) will dictate where the big end connection can be made in order to prevent the bevelled gears clashing with the big end connection and/or connection rods.

This may result in the big end connection being placed substantially away from or to the equatorial plane of the reciprocator. This may generate linear vibrations of the $2^{nd}$ or higher order due to the pistons then being controlled for movement in significantly non-sinusoidal manner. Vibrations of this type would be very detrimental to the operation of an engine at high speeds or in vibration sensitive applications.

Bevel gears do not beneficially lend themselves for use near the big end connection and/or connection rods. At gear PCR's allowing operation clear inside of the con rods, a bevel gear is subjected to high pitch line forces, due to re-acting the required torque at a small radius. Also the positioning of the bevel gear compromises the reciprocator structure by operating through space between the con-rod connection point and the centre of nutation. The result is a low maximum cylinder pressure, and hence low performance, that can be tolerated using practicable materials and construction methods.

At gear PCR's allowing operation clear outside of con rods and con rod to reciprocator connections, a bevel gear is subjected to high pitch line speeds at high operating speeds typical in automotive IC engines. High pitch line speeds require high precision and mechanically stiff components to maintain precise gear tooth engagement and lubrication.

Such precision is not practicable in a high performance lightweight IC engine. Positioning of a bevel gear outside of the con rods also requires a large gear component and related mounting structure with significant inertia and mass, leading to high inertia forces being applied to bearings and structures, which in turn must be made larger to carry these increased loads.

The practicable result is a low maximum operating speed, and hence low performance with large relative engine size and mass.

In addition to the above packaging limitations, bevel gears also have a number of intrinsic mechanical limitations related to torque transfer, speed, tooth strength etc. As a consequence of these limitations a number of alternative rotational restraint mechanisms have been provided. Such as for example, roller and slot arrangements, as disclosed in U.S. Pat. Nos. 1,948, 827 and 2,917,931. Such mechanisms are typically located in a radial location on the equatorial plane of the reciprocator, corresponding to the same plane as the connecting rod to reciprocator connector. While these substitutions have addressed a number of the issues intrinsic to bevel gears they have also introduced further limitations such as restraint tip speed, path and rotational velocity which all affect the overall performance envelope of the engine.

A restraint mechanism located off the equatorial plane is disclosed in U.S. Pat. No. 2,182,213. However, further disadvantages of this restraint mechanism is that only this particular engine embodiment is allowed, the restraint mechanism is always in a fixed relationship, leading to lubrication, wearing and/or reliability issues.

Restraint mechanisms presented in the prior art make no mention or attempt to achieve the required torsional stiffness for realistically operating in a high speed automotive sized IC engine. Low torsional stiffness is a characteristic apparent in much of the prior art, and especially those systems where the big end is located close to point X.

It is accordingly an object of this invention to provide improvements in or relating to an axial piston machine that offer freedom of design of rotation constraint mechanisms that do not significantly compromise engine operation, particularly but not solely at high or low speeds, provide improved packaging of the engine components, improved performance and/or that at least offer the public a useful choice.

BRIEF DESCRIPTION OF THE INVENTION

In a first aspect the present in invention may be said to be an axial piston machine acting as a thermodynamic engine, compressor, motor or pump comprising;

a crankshaft rotatable about a crankshaft axis and carrying a crank having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis that is coincident said crankshaft axis, each said cylinder including at least one cylinder opening to allow fluid inlet and/or outlet to/from said cylinder controlled (preferably valved control) in a manner to allow the machine to operate as a thermodynamic engine, compressor, motor or pump, in each cylinder, a complementary piston to reciprocate along a reciprocating axis defined by its respective cylinder, a reciprocator mounted to rotate relative to said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa in a sinusoidal or near sinusoidal manner, and allows controlled reciprocating displacement of each piston within its respective cylinder between top dead centre (TDC) and bottom dead centre (BDC), a plurality of pairs of rotation constrainers operative between said cylinder cluster and said reciprocator,
  each pair of rotation constrainers comprising of:
  a. a first member mounted with or by said cylinder cluster, and
  b. a second member mounted with or by said reciprocator, and positioned to allow the first member and second member of each pair to come in and out of engagement with each other in a manner to ensure homokinetic rotational constraint between said cylinder cluster and said reciprocator at the point of engagement of each respective first and second members so that at least one pair is in operative engagement at any one time, wherein each pair of rotation constrainers are positioned such that:
  (a) their relative movement does not clash with adjacent connection rods nor with the reciprocator to connection rod connection, yet
  (b) each second member is positioned at a distance from point X that, if moved by rotation about said crank axis sufficiently close to a notional plane radially extending from said crank axis and on which (a) said crank axis lies and (b) passing through the reciprocator to connection rod connection, the pair of rotation constrainers would start to clash with one or both of the reciprocator to connection rod connection or the respective connection rod.

Preferably the number of pairs of rotation constrainers equals the number of connection rods.

Preferably the number of pairs of rotation constrainers is twice the number of connection rods.

Preferably each second member is positioned at a distance from point X that, if moved by rotation about said crank axis to no less than 10 degrees and preferably between 10 to 30 degrees either side of a notional plane radially extending from said crank axis and on which (a) said crank axis lies and (b) passing through the reciprocator to connection rod connection, the pair of rotation constrainers would clash with one or both of the reciprocator to connection rod connection or the respective connection rod.

Preferably each second member is positioned at a distance from point X that, if moved by rotation about said crank axis to between 15 to 20 degrees either side of a notional plane radially extending from said crank axis and on which (a) said crank axis lies and (b) passing through the reciprocator to connection rod connection, the pair of rotation constrainers would clash with one or both of the reciprocator to connection rod connection or the respective connection rod.

Preferably each second member is positioned at a distance from point X that is midway between two notional planes each plane radially extending from said crank axis and on which (a) said crank axis lies and (b) passing through a reciprocator to connection rod connection.

Preferably a pair of rotation constrainers reside intermediate of each adjacent connection rods.

Preferably the connection rods are connected to said reciprocator at connection rod to reciprocator connections that are positioned to be at least one of (a) equispaced about the crank axis and (b) equidistant from point X.

Preferably said connection rod to reciprocator connections are made in or near a notional plane (herein also referred to as the equatorial plane) that is perpendicular to the crank axis and passes through point X.

Preferably said connection rod to reciprocator connections are made in or near a notional plane (herein also referred to as the equatorial plane) that is perpendicular to the crank axis and passes through point X such that the motion of the piston in each cylinder is substantially sinusoidal.

Preferably each second member is positioned on a notional plane that radially extends from said crank axis and on which said crank axis lies and intermediate of:

a) a second notional plane that radially extends from said crank axis and on which said crank axis lies that passing through a first reciprocator to connection rod connection, and b) a third notional plane that radially extends from said crank axis and on which said crank axis lies that passes through a second and immediately adjacent reciprocator to connection rod connection.

Preferably there is only one second member located between said second and third notional planes.

Preferably there are at least two second member located between said second and third notional planes.

Preferably a said second member is located intermediate, and preferably midway, between the second and third notional planes.

Preferably said second member is biased in one direction between the second and third notional planes.

Preferably said first and second members are a complementary shaped pairs where said second members each comprise of a receptacle and each said first members comprise a receptacle receivable member capable of being received by said receptacle.

Preferably said first and second members are a mutually shaped pair where said first member each comprise of a receptacle and each said second member comprises a receptacle receivable member capable of being received by said receptacle.

Preferably the second member is provided with a cam profiled receptacle surface and the first member is a cam follower.

Preferably the first member is provided with a cam profiled receptacle surface and the second member is a cam follower.

Preferably said cam follower comprises a contact surface that is at least partially of a shape selected from (a) cylindrical, (b) constant radiused or (c) having a variable curvature surface.

Preferably each receptacle receivable member comprises
a wheel
an axle mounted by said cylinder cluster and defining an axis of rotation about which said wheel can rotate said axis of rotation extending in a plane that is coincident with and in which said crankshaft axis lies.

Preferably said axis of rotation of the wheel is coaxial to a notional median line that is normal to a line that bisects angle A at full engagement.

Preferably the axis of rotation of said wheel is aimed at point X.

Preferably said axis of rotation of the wheel passes through point X.

Preferably the first members are located to be able to be received by such positioned second members when the motion of each second member is at full engagement with a respective said first member and around a point where its position is substantially stationary in a latitudinal direction (and preferably also in a longitudinal direction relative the cylinder cluster) of a notional sphere with its centre at point X and stationary relative said cylinder cluster.

Preferably each first member is located to be able to receive such positioned second member when the motion of the second member, along its locus, approached and/or passes through a notional median line that is normal to a line that bisects angle A.

Preferably the receptacle is of a shape and configuration to allow the receipt and exit of the receptacle receivable member.

Preferably the axis (eg the wheel axis) is coaxial to a notional median line that is normal to a line that bisects angle A at full engagement.

Preferably the receptacle is of a shape and configuration to allow the receipt and exit of the receptacle receivable member in a manner that maintains homo kinetic rotation constraint.

Preferably each said receptacle comprises of two reaction surfaces over and against which a respective said receptacle receivable member can slide/roll, the receptacle receivable member making contact with a first of said surfaces as the receptacle receivable member progresses towards the median line and a second of said surfaces as the receptacle receivable member progresses away from the median line.

Preferably the receptacle receivable member is instantaneously nominally stationary in longitude and latitude directions of a notional sphere with it centre at point X, as it transfers from the first of said surfaces to the second of said surfaces.

Preferably the reciprocator is mounted to rotate about said crank and said cylinder cluster rotates relative to a ported member that includes at least one inlet and outlet port for each cylinder and to which each said cylinder moves into fluid communication with as said cylinder cluster rotates, appropriately timed to the position of the pistons in each cylinder between TDC and BDC by an indexing drive that maintains relative timing of the cylinder cluster with the ported member and to effect said valved control.

Preferably said valved control is effected by virtue of a rotational displacement of the cylinder cluster relative to the ported member.

Preferably valved control is effected by virtue of the movement of a piston in its cylinder and/or piston and cylinder arrangement relative to at least one cylinder port.

Preferably the indexing drive is any gearing arrangement that provides the appropriate ratio between the cylinder cluster and the crankshaft.

Preferably the indexing drive comprises two series of rotation drivers operative between said ported member and said reciprocator, a first series mounted with or by said reciprocator and comprising N drive elements, and a second series mounted with or by said ported member and comprising N+I or (N−I) driver elements, where I is any positive integer.

Preferably the first series of rotation drivers are positioned, spaced apart from each other, about the crank axis.

Preferably the second series of rotation drivers are positioned, spaced apart from each other, about the crank shaft axis.

Preferably the first series of rotation drivers mounted to the reciprocator may comprise of N number of driver elements and the second series of rotation drivers mounted to the ported member and comprising N' driver elements, wherein the relationship between N and N' is governed by the following equations.

$N'=N\pm I$ $N=Cyl_{number} \times I$ $Cyl_{Number}$=the number of cylinders in a cylinder cluster $I$=the ratio of rotation drivers to cylinders Preferably the drive elements are positioned to allow said first and second series to come in and out of engagement with each other in a manner to ensure effective rotation between said cylinder cluster and said ported member.

Preferably each drive element of said second series comprises of a receptacle and each drive element of said first series comprises a receptacle receivable member.

Preferably each drive element of said first series comprises:
a wheel
an axle mounted to said reciprocator and defining an axis of rotation about which said wheel can rotate said axis of rotation extending in a plane in which said crank axis lies.

Preferably said axis passes through said crank axis.

Preferably said receptacle is of a shape and configuration to allow the receipt and exit of the receptacle receivable member.

Preferably the effective rotation of said indexing drive is of constant velocity.

Preferably each drive element of said first series comprises of a receptacle and each drive element of said second series comprises a receptacle receivable member.

Preferably each drive element of said second series comprises:
a wheel
an axle mounted to said ported member and defining an axis of rotation about which said wheel can rotate said axis of rotation extending in a plane in which said crankshaft axis lies.

Preferably said axis passes through said crankshaft axis.

Preferably said receptacle is of a shape and configuration to allow the receipt and exit of the receptacle receivable member.

Preferably the effective rotation of said indexing drive is of constant velocity relative to the crankshaft.

In a second aspect the present invention may be said to be a motion conversion mechanism comprising:
a primary element mounted to rotate about a primary crank axis and comprising a primary crankshaft mounted z-crank having an operational axis that intersects the primary crankshaft axis at point X at an angle A;

a stator element relative to which said primary element can rotate and comprising a plurality of engagement elements (herein after "stator elements") arranged in an annular manner about the primary axis and about the base circumference of a notional cone having a primary axis coaxial to said primary crankshaft axis and apex coincident at point X;

a nutator body mounted to the z crank to rotate freely about the operational axis, the body having a centre of nutation at point X;

a plurality of reciprocating engagement elements (herein after "nutator elements") carried by said nutator body at points:
1. on or near an equatorial plane normal to the operational axis and including point X, and
2. at an equal distance from point X, said points moving on a symmetrical or near symmetrical lemniscate locus during movement of said nutating body;

wherein said nutator elements are arranged in an annular spaced apart configuration about the base circumference of a notional cone identical in shape to that of the stator elements and having a primary axis coaxial to the operative axis and apex coincident with point X, said spaced apart configuration complementary to that of said stator elements, wherein the stator elements and nutator elements are adapted and positioned so that at any one time during operation of the motion conversion mechanism, at least one nutator element and at least one stator element are in operative engagement with each other (the engagement point") such that the sequential reciprocation of the stator and nutator elements causes the nutator to nutate homokinetically about point x, with corresponding sequential engagement and disengagement of the stator and nutator elements, that in turn causes the primary element to rotate about the crankshaft axis at 1 rotation per nutation cycle—or vice versa wherein the engagement point is located on or about the same radial distance from point X as the radial distance from point X of the reciprocating elements.

Preferably the radial position of the engagement elements is intermediate the radial position of the reciprocating elements.

Preferably the radial position of the engagement elements places at least one engagement element intermediate of two adjacent of reciprocating elements.

Preferably the nutator and stator elements comprise of mutually shaped compatible pairs.

Preferably each nutator element comprises of a cam follower and each said stator element comprises of a cam surface along which a said cam follower can travel.

Preferably each stator element comprises of a cam follower and each said nutator element comprises of a cam surface along which a said cam follower can travel.

Preferably the stator elements are arranged in series.

Preferably the nutator elements are arranged in series.

Preferably the stator elements are arranged in an equispaced series.

Preferably the nutator elements are arranged in an equispaced series.

Preferably the stator elements are directed toward the cone apex at point X and at a slant angle of A/2, the primary crankshaft axis passing through the centre point of the conical configuration and point X, and the primary element rotatable within the stator.

Preferably the stator elements are presented for engagement with a respective nutator element at a location that when engaged, is on a line passing through point X extending radially out from said operative axis and at an angle thereto of A/2.

Preferably the nutator elements are presented for engagement with a respective stator element at a location that when engaged, is on a line passing through point X extending radially out from said operative axis and at an angle thereto of A/2.

Preferably the stator elements are a male component.

Preferably the stator elements are a female component.

Preferably the stator elements comprise a mixture of male and female components.

Preferably said male components comprise a wheel and the female components comprise a complementary cup shaped to maintain each wheel and cup in unidirectional rolling contact during engagement and disengagement portions of the nutation cycle.

Preferably for the nutator-stator engagement the number of symmetrically and singularly disposed engagement elements can be a small multiple or fraction of the number of reciprocating components.

Preferably for the nutator-stator engagement the number of symmetrically and singularly disposed engagement elements is sufficient for at least two of the elements to be engaged with its corresponding mate at any point in time.

Preferably for the nutator-stator engagement the radial position (angle) of the engagement elements is intermediate the radial (angle) position of the reciprocating components.

Preferably for the nutator-stator engagement the engagement elements can be placed at all radial distances from point X, including the radial distances of the reciprocating elements wherein the radial angle of the engagements is intermediate the radial angle of the reciprocating components.

Preferably for the nutator-stator engagement the engagement elements can be place at any radial position (angle) where the radial distance is greater or less than that of the reciprocating components.

Preferably the mechanism is used for the purposes of conversion of reciprocating motion to rotary motion or vice versa or both.

Preferably the reciprocating components are ion rotational synchronisation with said nutating body about the crankshaft axis.

In a further aspect the present in invention may be said to be an apparatus/mechanism as herein before described when employed in an engine.

In a further aspect the present in invention may be said to be an apparatus/mechanism as herein before described when employed in a pump.

In a further aspect the present in invention may be said to be an apparatus/mechanism as herein before described when employed as speed change apparatus (rotary to rotary conversion).

In a further aspect the present in invention may be said to be an apparatus/mechanism as herein before described acting or to act as a reciprocating expander or compressor.

In yet a further aspect the present invention may be said to be an axial piston machine acting as a thermodynamic engine, compressor, motor or pump comprising;

a crankshaft rotatable about a crankshaft axis and carrying a crank having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder, in each cylinder, a complementary piston to reciprocate along a reciprocating axis defined by its respective cylinder, a reciprocator mounted to rotate relative said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa, and allows consistent and controlled reciprocating displacement of each piston within its respective cylinder between top dead centre (TDC) and bottom dead centre (BDC)

a plurality of pairs of rotation constrainers operative between said cylinder cluster and said reciprocator, each pair of rotation constrainers comprising of a first member mounted with said cylinder cluster and second member mounted with said reciprocator and positioned to allow the first member and second member of each pair to come in and out of engagement with each other in a manner to ensure homokinetic rotational constraint between said cylinder cluster and said reciprocator and so that at least one pair is in operative engagement at any one time wherein no second members are located on a notional radial plane in which said crank axis lies and in which the connection between the connection rod and said reciprocator lies.

Preferably the operative constraint effected by said second members occurs at a distance from point X that is no less than 30% away from the PCR at which the connection rods are engaged to said reciprocator.

Preferably the operative constraint effected by said second members occurs at a distance from point X that is no greater than 30% away from the PCR at which the connection rods are engaged to said reciprocator.

In even a further aspect the present invention may be said to be an axial piston machine acting as a thermodynamic engine, compressor, motor or pump comprising;

a crankshaft rotatable about a crankshaft axis and carrying two cranks each having an inclined crank axis that is at an angle to the crankshaft axis but aligned to intersect therewith at an acute angle A at a point (point X) on the crankshaft, a combustion chamber assembly located between said two cranks and defining at least two combustion chambers rigidly located with respect to each other, each combustion chamber spaced relative to the other(s) about a combustion chamber assembly axis that is coincident said crankshaft axis, each said combustion chamber including at least one opening to allow fluid inlet and/or outlet to/from said combustion chamber controlled (preferably valved control) in a manner to allow the machine to operate as a thermodynamic engine, compressor, motor or pump, a reciprocator mounted to rotate relative to each said crank about said inclined crank axis, each said reciprocator operatively connected to a piston acting in or on each combustion chamber, by a respective connection rod, such that the rotational motion of the crankshaft with respect to the combustion chamber assembly drives the reciprocal motion of two pistons within a respective combustion chamber or vice versa in a sinusoidal or near sinusoidal manner, between piston top dead centre (TDC) and bottom dead centre (BDC) positions, for each reciprocator, a plurality of pairs of rotation constrainers operative between said combustion chamber assembly and said reciprocator, each pair of rotation constrainers comprising of:
a. a first member mounted with or by said combustion chamber assembly, and
b. a second member mounted with or by said reciprocator, and
positioned to allow the first member and second member of each pair to come in and out of engagement with each other in a manner to ensure homokinetic rotational constraint between said combustion chamber assembly and said reciprocator at the point of engagement of each respective first and second members so that at least one pair is in operative engagement at any one time,
wherein each pair of rotation constrainers are positioned such that:
(a) their relative movement does not clash with adjacent connection rods nor with the reciprocator to connection rod connection, yet
(b) each second member is positioned at a distance from point X that, if moved by rotation about said crank axis sufficiently close to a notional plane radially extending from said crank axis and on which (a) said crank axis lies and (b) passing through the reciprocator to connection rod connection, the pair of rotation constrainers would start to clash with one or both of the reciprocator to connection rod connection or the respective connection rod.

Preferably valved control is provided by an inlet port and a separate exhaust port in the wall of each combustion chamber, said port opening controlled by the relative position of the piston.

In a further aspect the present invention may broadly be said to be an axial piston machine acting as a thermodynamic engine, compressor, motor or pump comprising;

a crankshaft rotatable about a crankshaft axis and carrying a crank having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder, in each cylinder, a complementary piston to reciprocate along a reciprocating axis defined by its respective cylinder, a reciprocator mounted to rotate relative said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa, and allows consistent and controlled reciprocating displacement of each piston within its respective cylinder between top dead centre (TDC) and bottom dead centre (BDC)

a plurality of pairs of rotation constrainers operative between said cylinder cluster and said reciprocator, each pair of rotation constrainers comprising of a first member mounted by said cylinder cluster and second member mounted by said reciprocator and positioned to allow the first member and second member of each pair to come in and out of engagement with each other in a manner to ensure homokinetic rotational constraint between said cylinder cluster and said reciprocator and so that at least one pair is in operative engagement at any one time wherein when viewed in a direction looking along the crank axis, the reciprocator carries at a substantially equal distance from point X, at least 3 connection rod connection points intermediate of each adjacent connection points and also at substantially the same distance from point X is at least one of said second members.

In a further aspect the present invention may broadly be said to be an axial piston machine acting as a thermodynamic engine, compressor, motor or pump comprising;

a crankshaft rotatable about a crankshaft axis and carrying a crank having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder, in each cylinder, a complementary piston to reciprocate along a reciprocating axis defined by its respective cylinder, a reciprocator mounted to rotate relative said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa, and allows consistent and controlled reciprocating displacement of each piston within its respective cylinder between top dead centre (TDC) and bottom dead centre (BDC)

a plurality of pairs of rotation constrainers operative between said cylinder cluster and said reciprocator, each pair of rotation constrainers comprising of a first member mounted with (and preferably by) said cylinder cluster and second member mounted with (and preferably by) said reciprocator and positioned to allow the first member and second member of each pair to come in and out of engagement with each other in a manner to ensure rotational constraint between said cylinder cluster and said reciprocator and so that at least one pair is in operative engagement at any one time and can achieve homo-kinetic constraint between the cylinder cluster and the reciprocator, and wherein the reciprocator is mounted to rotate about said crank and said cylinder cluster rotates relative to a ported member that includes at least one inlet and outlet port for each cylinder and to which each said cylinder moves into fluid communication with as said cylinder cluster rotates, appropriately timed to the position of the pistons in each cylinder between TDC and BDC by an indexing drive that comprises:

two series of rotation drivers operative between said ported member and said reciprocator, wherein a first series of rotation drivers is mounted to or by the reciprocator and may comprise of N number of driver elements and the second series of rotation drivers mounted to or by the ported member and comprising N' driver elements, wherein the relationship between N and N' is governed by the following equations:

$$N' = N \pm I$$

$$N = Cyl_{Number} \times I$$

$Cyl_{Number}$ = the number of cylinders in a cylinder cluster $I$ = the ratio of rotation drivers to cylinders.

Preferably the drive elements are positioned to allow said first and second series to come in and out of engagement with each other in a manner to ensure effect rotation between said cylinder cluster and said ported member.

Preferably each drive element of said second series comprises of a receptacle and each drive element of said first series comprises a receptacle receivable member.

Preferably each drive element of said first series comprises:
a wheel
an axle mounted to said reciprocator and defining an axis of rotation about which said wheel can rotate said axis of rotation extending in a plane in which said crank axis lies.

Preferably said axis passes through said crank axis.

Preferably each receptacle is of a shape and configuration to allow the receipt and exit of the receptacle receivable member.

Preferably the effective rotation of said indexing drive is of constant velocity.

Preferably each drive element of said first series comprises of a receptacle and each drive element of said second series comprises a receptacle receivable member.

Preferably each drive element of said second series comprises:
a wheel
an axle mounted to said ported member and defining an axis of rotation about which said wheel can rotate said axis of rotation extending in a plane in which said crankshaft axis lies.

Preferably said axis passes through said crankshaft axis.

Preferably receptacle is of a shape and configuration to allow the receipt and exit of the receptacle receivable member.

Preferably the effective rotation of said indexing drive is of constant velocity.

Preferably the connection between each the connection rod and the reciprocator is one to ensure sinusoidal motion of the respective piston in its cylinder.

Preferably said connection rod to reciprocator connections are made in a notional plane that is perpendicular to the crank axis and passes through point X.

Preferably the reciprocator is mounted to rotate relative to said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa in a sinusoidal or near sinusoidal manner, and allows controlled reciprocating displacement of each piston within its respective cylinder between top dead centre (TDC) and bottom dead centre (BDC).

Preferably said connection rod to reciprocator connections are made in a notional plane that is perpendicular to the crank axis and passes through point X such that the motion of the piston in each cylinder is substantially sinusoidal.

In a further aspect the present invention may broadly be said to be an axial piston machine acting as a thermodynamic engine, compressor, motor or pump comprising;
a crankshaft rotatable about a crankshaft axis and carrying a crank having an inclined crank axis that is at an angle to the crankshaft axis but aligned to intersect therewith at an acute angle A at a point (point X) on the crankshaft,
a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder,
in each cylinder, a complementary piston to reciprocate along a reciprocating axis defined by its respective cylinder,
a reciprocator mounted to rotate relative said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa, and allows consistent and controlled reciprocating displacement of each piston within its respective cylinder between top dead centre (TDC) and bottom dead centre (BDC)
rotation constrainers operative between said cylinder cluster and said reciprocator to ensure homo kinetic rotational constraint between said cylinder cluster and said reciprocator, and
wherein the reciprocator is mounted to rotate about said crank and said cylinder cluster rotates relative to a ported member that includes at least one inlet and outlet port for each cylinder and to which each said cylinder moves into fluid communication with as said cylinder cluster rotates, appropriately timed to the position of the pistons in each cylinder between TDC and BDC by an indexing drive that comprises:
two series of rotation drivers operative between said ported member and said reciprocator,
wherein a first series of rotation drivers is mounted to or by the reciprocator and may comprise of N number of driver elements and the second series of rotation drivers mounted to or by the ported member and comprising N' driver elements, wherein the relationship between N and N' is governed by the following equations:

$$N'=N\pm I$$

$$N=Cyl_{number} \times I$$

$Cyl_{Number}$=the number of cylinders in a cylinder cluster $I$=the ratio of rotation drivers to cylinders.

Preferably the drive elements are positioned to allow said first and second series to come in and out of engagement with each other in a manner to ensure effect rotation between said cylinder cluster and said ported member.

Preferably each drive element of said second series comprises of a receptacle and each drive element of said first series comprises a receptacle receivable member.

Preferably each drive element of said first series comprises:
a wheel
an axle mounted to said reciprocator and defining an axis of rotation about which said wheel can rotate said axis of rotation extending in a plane in which said crank axis lies.

Preferably said axis passes through said crank axis.

Preferably each receptacle is of a shape and configuration to allow the receipt and exit of the receptacle receivable member.

Preferably the effective rotation of said indexing drive is of constant velocity.

Preferably each drive element of said first series comprises of a receptacle and each drive element of said second series comprises a receptacle receivable member.

Preferably each drive element of said second series comprises:
a wheel
an axle mounted to said ported member and defining an axis of rotation about which said wheel can rotate said axis of rotation extending in a plane in which said crankshaft axis lies.

Preferably said axis passes through said crankshaft axis.

Preferably receptacle is of a shape and configuration to allow the receipt and exit of the receptacle receivable member.

Preferably the effective rotation of said indexing drive is of constant velocity.

Preferably the connection between each the connection rod and the reciprocator is one to ensure sinusoidal motion of the respective piston in its cylinder.

Preferably said connection rod to reciprocator connections are made in a notional plane that is perpendicular to the crank axis and passes through point X.

Preferably the reciprocator is mounted to rotate relative to said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa in a sinusoidal or near sinusoidal manner, and allows controlled reciprocating displacement of each piston within its respective cylinder between top dead centre (TDC) and bottom dead centre (BDC).

Preferably said connection rod to reciprocator connections are made in a notional plane that is perpendicular to the crank axis and passes through point X such that the motion of the piston in each cylinder is substantially sinusoidal.

In a further aspect the present invention may broadly be said to be an axial piston machine acting as a thermodynamic engine, compressor, motor or pump comprising;

a crankshaft rotatable about a crankshaft axis and carrying a crank having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder, in each cylinder, a complementary piston to reciprocate along a reciprocating axis defined by its respective cylinder, a reciprocator mounted to rotate relative said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa, and allows consistent and controlled reciprocating displacement of each piston within its respective cylinder between top dead centre (TDC) and bottom dead centre (BDC)

a plurality of pairs of rotation constrainers operative between said cylinder cluster and said reciprocator, each pair of rotation constrainers comprising of a first member mounted with said cylinder cluster and second member mounted with said reciprocator and positioned to allow the first member and second member of each pair to come in and out of engagement with each other in a manner to ensure homokinetic rotational constraint between said cylinder cluster and said reciprocator and so that at least one pair is in operative engagement at any one time wherein no second members are located to operate on a radial plane that is coincident to said crank axis and on which the connection rod are engaged to said reciprocator.

Preferably said connection rod to reciprocator connections are made in a notional plane that is perpendicular to the crank axis and passes through point X such that the motion of the piston in each cylinder is substantially sinusoidal.

In a further aspect the present invention may broadly be said to be an axial piston machine acting as a thermodynamic engine, compressor, motor or pump comprising;

a crankshaft rotatable about a crankshaft axis and carrying a crank having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder, in each cylinder, a complementary piston to reciprocate along a reciprocating axis defined by its respective cylinder, a reciprocator mounted to rotate relative said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa in a sinusoidal or near sinusoidal manner, and allows consistent and controlled reciprocating displacement of each piston within its respective cylinder between top dead centre (TDC) and bottom dead centre (BDC), a plurality of pairs of rotation constrainers operative between said cylinder cluster and said reciprocator, each pair of rotation constrainers comprising of:

a. a first member mounted with said cylinder cluster, and b. a second member mounted with said reciprocator, and positioned to allow the first member and second member of each pair to come in and out of engagement with each other in a manner to ensure homokinetic rotational constraint between said cylinder cluster and said reciprocator at the point of engagement of each respective first and second members and so that at least one pair is in operative engagement at any one time, wherein each second member is positioned on a notional plane that radially extends from said crank axis and on which said crank axis lies that lies intermediate of:

a) a second notional plane that radially extends from said crank axis and on which said crank axis lies that passing through a first reciprocator to connection rod connection and b) a third notional plane that radially extends from said crank axis and on which said crank axis lies that passing through a second and immediately adjacent reciprocator to connection rod connection.

Preferably the first mentioned notional plane bisects the angle between the second and third notional plane.

Preferably the first mentioned notional plane is one that trisects the angle between the second and third notional plane, there being two second members intermediate of the second and third notional planes.

In a further aspect the present invention may broadly be said to be an axial piston machine acting as a thermodynamic engine, compressor, motor or pump comprising;

a crankshaft rotatable about a crankshaft axis and carrying a crank journal having an inclined crank axis that is at an angle to the crankshaft axis but aligned to intersect therewith at an acute angle A at a point (point X) on the crankshaft, a cylinder cluster comprising at least two cylinders rigidly located with respect to each other, each cylinder spaced relative to the other(s) about a cylinder cluster axis, each said cylinder including at least one cylinder opening to allow fluid inlet and/or outlet to/from said cylinder, in each cylinder, a complementary piston to reciprocate along a reciprocating axis defined by its respective cylinder, a reciprocator mounted to rotate relative to said crank journal about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa in a sinusoidal or near sinusoidal manner, and allows consistent and controlled reciprocating displacement of each piston within its respective cylinder between top dead centre (TDC) and bottom dead centre (BDC), a plurality of pairs of rotation constrainers operative between said cylinder cluster and said reciprocator, each pair of rotation constrainers comprising of:
a. a first member mounted with said cylinder cluster, and
b. a second member mounted with said reciprocator, and positioned to allow the first member and second member of each pair to come in and out of engagement with each other in a manner to ensure homokinetic rotational constraint between said cylinder cluster and said reciprocator at the point of engagement of each respective first and second members so that at least one pair is in operative engagement at any one time, wherein the second members are located at substantially the same PSR as where the connection rods engage with said reciprocator, and wherein each second member is positioned such that upon engagement, said second member is located on a notional median line that radially extends from the crank axis at and angle that is normal to a line that bisects angle A.

In yet a further aspect the present invention may be said to be, in an axial piston machine of a kind that comprises a plurality of pistons each reciprocating in a respective cylinder in a direction substantially parallel or at an acute angle to a crankshaft axis, the crankshaft axis presenting a crank that is at an angle to the crankshaft axis and to which a reciprocator is mounted to effect the controlled movement of the pistons in their cylinders via a connection mechanism that connects each said piston with said reciprocator, at least one pair of rotational constraint mechanisms to constrain the movement between the reciprocator and the pistons, and capable of engaging with one another in an intermittent and rolling manner.

Preferably the rotational constraint mechanism is located at distance from the crankshaft, that has the capacity to clash with the position of the connection mechanism, yet the positioning having been selected to not clash with the connection mechanism.

In yet a further aspect the present invention may be said to be, in an axial piston machine of a kind that comprises a plurality of pistons each reciprocating in a respective cylinder in a direction substantially parallel or at an acute angle to a crankshaft axis, the crankshaft axis presenting a crank that is at an angle to the crankshaft axis and to which a reciprocator is mounted to effect the controlled movement of the pistons in their cylinders via a connection mechanism that connects each said piston with said reciprocator, a timing apparatus that comprises:

a first member that moves the reciprocator, and
a second member that is able to receive the first member in an intermittent and rolling contact manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

As used herein the term "and/or" means "and" or "or", or both.

As used herein "(s)" following a noun means the plural and/or singular forms of the noun.

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

PCR refers to Pitch Circle Radius. PCR may be taken to mean the nominal radius of the line of action of component measured from Point X.

Any reference herein to "centre of nutation" means point X.

Any reference herein to "nutation cycle" means one rotation of the crank shaft relative to a nutating body.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

BRIEF DESCRIPTION OF THE DRAWINGS

Preferred forms of the present invention will now be described with reference to the accompanying drawings in which.

DETAILED DESCRIPTION OF THE INVENTION

Figure 1:
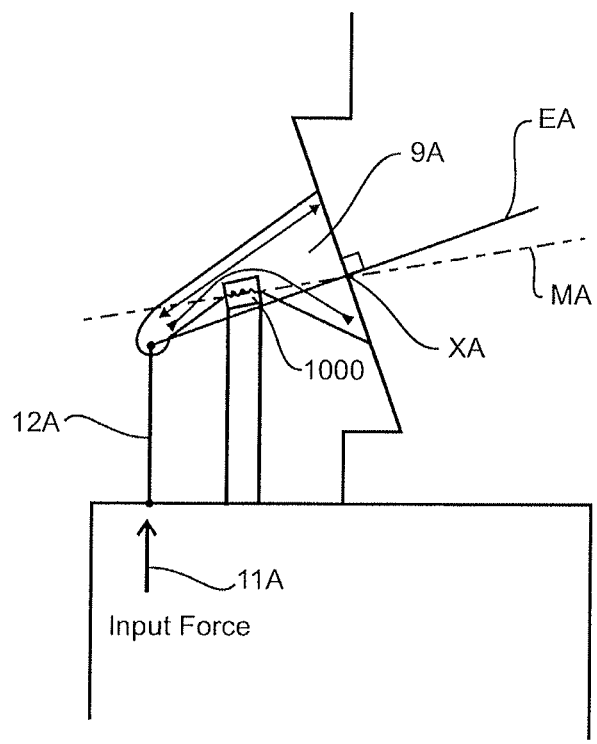
FIG. 1 illustrates a prior art Z-crank machine illustrating the positioning of the synchronisation bevelled gears being at a location closer to point XA than where the con-rod to reciprocator coupling is proved by the reciprocator.
Figure 2:
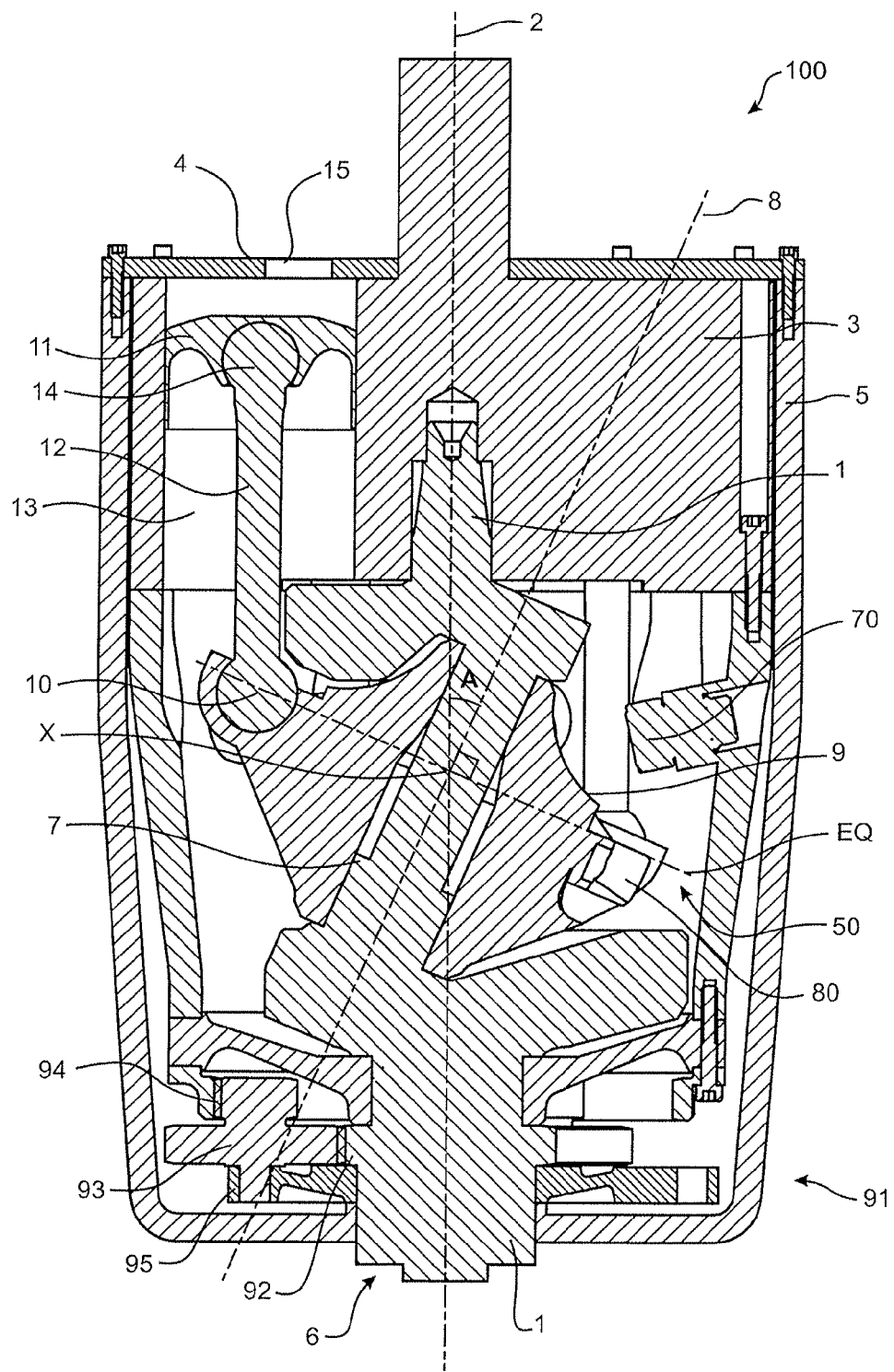
FIG. 2 is a sectional view of a first preferred form of the present invention, operating as a 5 cylinder internal combustion engine, some elements of the engine not being shown for ease of illustration.
Figure 3:
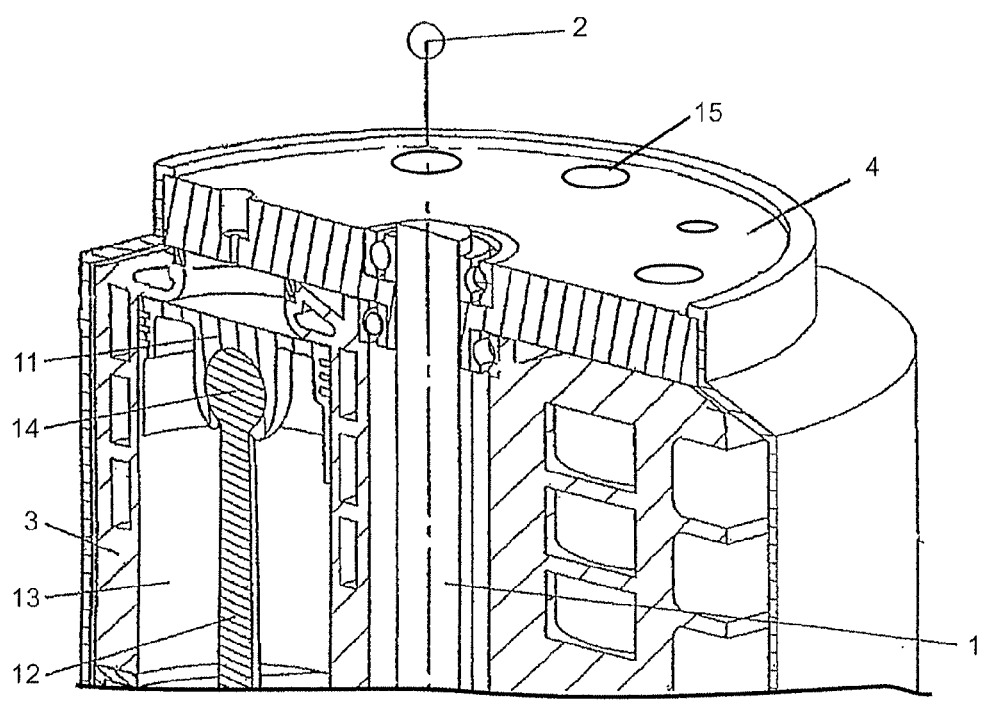
FIG. 3 is a sectional perspective view showing the end of an engine as per the first preferred form to illustrate the porting and cylinder cluster.

With reference to FIG. 2 there is shown a simplified cross sectional drawing of a first preferred form of the present invention. It omits any cylinder head or fluid porting detail as well as bearings, cooling and other utilities. By way of example, U.S. Pat. No. 6,494,171 describes the relationship between the cylinder cluster and the cylinder and the ports that provide the utilities for the operation of an axial piston machine as a combustion engine. U.S. Pat. No. 6,494,171 is accordingly hereby incorporated by way of reference. The machine according to FIG. 2 is able to operate as a 4 stroke internal combustion engine, utilising 5 cylinders and where the cylinders rotate relative to an engine body in a direction that is counter to the direction of rotation of the crankshaft. Other embodiments with different numbers of cylinders, co-rotation of the cylinder cluster and crankshaft, variations in cycle and ignition or heat transfer are envisaged. Also, the operation of the machine as a pump or motor is envisaged.

As shown in FIG. 2, the axial piston machine comprises a crankshaft 1 having a crankshaft axis 2. The crankshaft 1 is supported by bearings (not shown) that allow the crankshaft to rotate about the crankshaft axis 2 relative to and with respect to a cylinder cluster 3, ported member 4 and engine casing 5.

The crankshaft 1 operates as a power output shaft when the axial piston machine operates as an engine. In an alternative form it can act as an input shaft when the axial piston machine operates as a pump this being achieved via the crankshaft end 6 for example. This may be a splined end, carry a sprocket or gear or other means to allow transfer of torque to or from the crankshaft 1.

Disposed from, and either forming an integral part of, or securable to the crankshaft 1, is crank 7 (also herein referred to as the Z-crank) having a crank axis 8. The crankshaft axis 2 and crank axis 8 intersect at a point X at an acute angle A. This is also referred to as the "crank angle"

Disposed from and rotatable on suitable bearings about the crank 7 about crank axis 8 is the reciprocator 9. The reciprocator may also herein be referred to as a nutator body. The body of the reciprocator 9 bridges between said reciprocator bearings at the crank and the connection rods 12. Each connection rod is connected at their "little end connection" to a piston 11. The connection rods 12 connect to the reciprocator at the "big end connection". This occurs at big end connection points 10.

The reciprocator is of a structure that is robust enough to withstand the inertial and fluid expansion forces (when the machine operates as a combustion engine) imparted via the pistons 11 and connecting rods 12 while endeavouring to minimise the moment of inertia of the reciprocator about point X so as to reduce the inertial forces on the reciprocator bearings.

The reciprocator 9 controls the reciprocating motion of the pistons 11 within the cylinders 13 of the cylinder cluster 3 via the connection rods 12. The cylinders may have cylinder axes that are parallel to each other or at an angle to each other.

The connection rods 12 link together the reciprocator 9 and the pistons 11.

Rotational constraint between the cylinder cluster 3 and the reciprocator 9, such that both rotate about the crankshaft axis 2 at the same average angular velocity is controlled by a rotation constraint mechanism that will hereinafter be described. In the absence of a rotation constraint mechanism the linear motion of the pistons 11 could not be transferred to the rotational motion of crankshaft 1 about its crankshaft axis 2 or vice versa.

Relative rotation of the cylinder cluster 3 about the crankshaft axis 2 and relative to fluid inlet and outlet ports (eg port 15 being one such port) of the ported member 4 may be effected by an indexing drive that will herein after be described. In an alternative embodiment of the invention, there may be no such relative rotation and porting is achieved in a different manner such as with poppet valves.

Where the machine operates in a manner according to the first embodiment, the cylinder openings are valved by virtue of their sliding relative to the ported member 4 as they rotate about the crankshaft axis 2. The ports or the ported member 4 are positioned to sequentially come into alignment with the cylinder opening of each cylinder (directly or indirectly) to allow fluid transfer to occur (and spark plug exposure to occur, if the engine is operating as a spark ignition engine).

Figure 4:
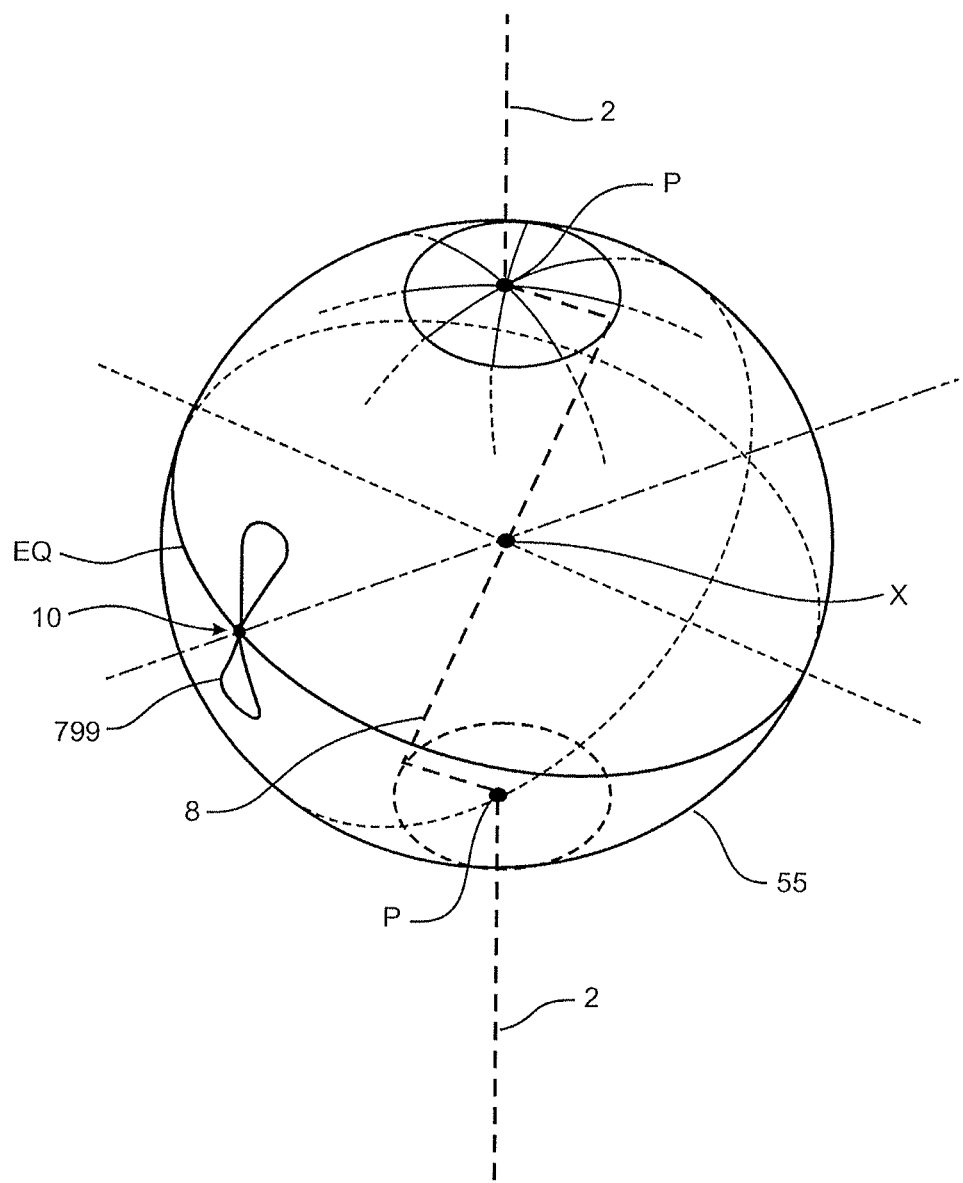
FIG. 4 illustrates a path traveled by a point on the reciprocator at or near where the connection rod is engaged to the reciprocator (herein after referred to as the big end connection), in a reference frame stationary to any cylinder cluster rotation.

FIG. 4 illustrates a graphical representation of the lemniscate path 799, traced on an imaginary sphere 55 having a centre at point X, by a big end connection point 10, in a reference frame stationary to the cylinder cluster, as the piston travels between top dead centre (herein referred to as TDC) and bottom dead centre (herein referred to as BDC). In this instance the big end connection point 10 is positioned on the equatorial plane EQ that is perpendicular to the crank axis 8 and passed through point X. In the preferred form of the invention, the big end connection point is at the equatorial plane EQ but slight displacement of EQ and towards either pole is also contemplated. Hence where reference herein is made to being on the EQ, it will be appreciated that this can also include to mean to be substantially but not exactly on the EQ.

Figure 19:
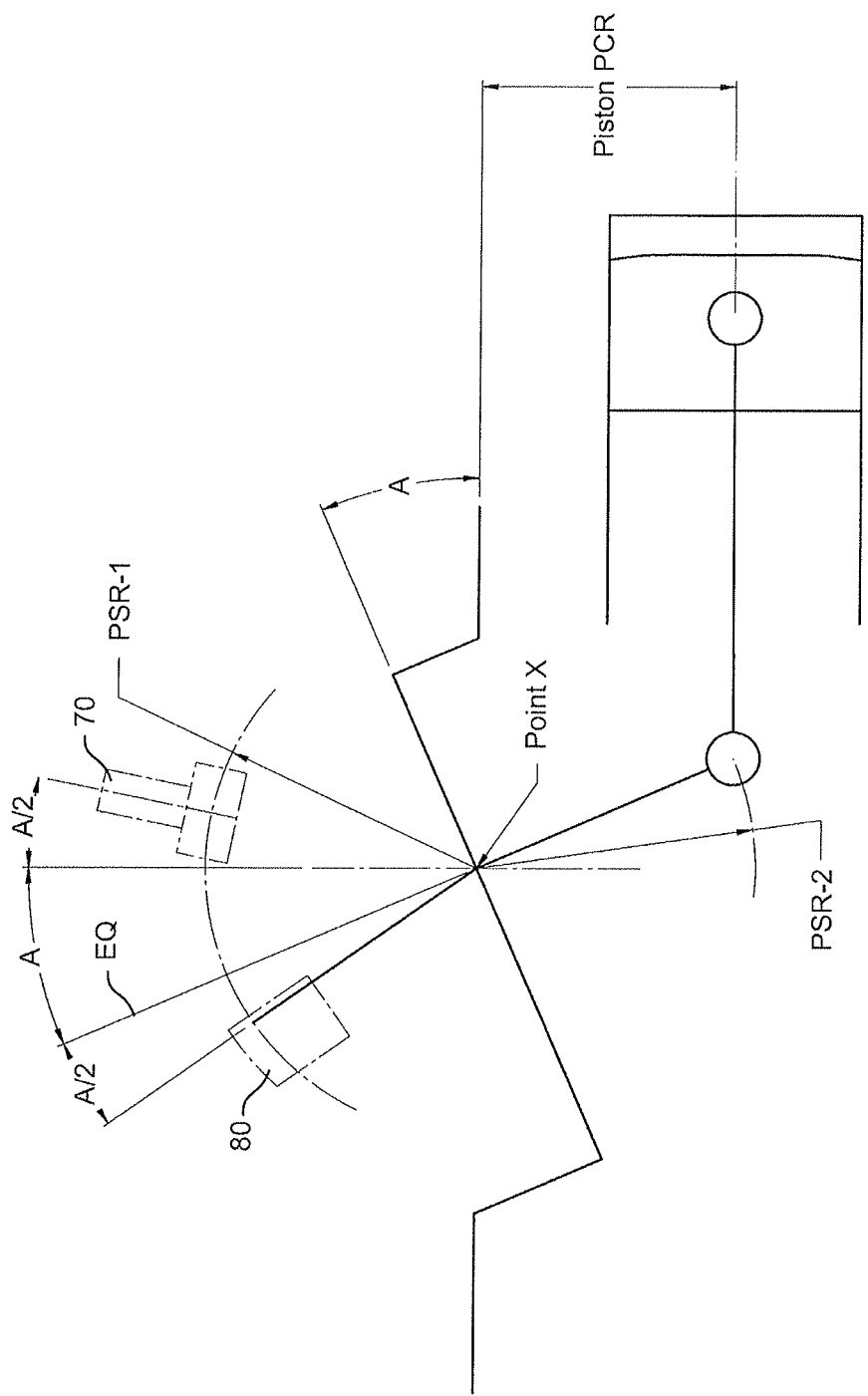
FIG. 19 illustrates further geometry in respect of preferred positioning of the big end connection and the rotation constrainers, FIG. 20 illustrated how a compact reciprocator can be provided that allows direct force transfer to the crank, torque transfer to effect rotation constraint and a desirable distance from the crank.

The radial distance from point X to the point where the con-rods and the reciprocator are connected remains fixed. The motion of this connection point is on the surface of a notional sphere at a distance from point X herein referred to as the "connection rod pitch spherical radius" or "connection rod PSR". This is shown in FIG. 19 as PSR-2.

Figure 5:
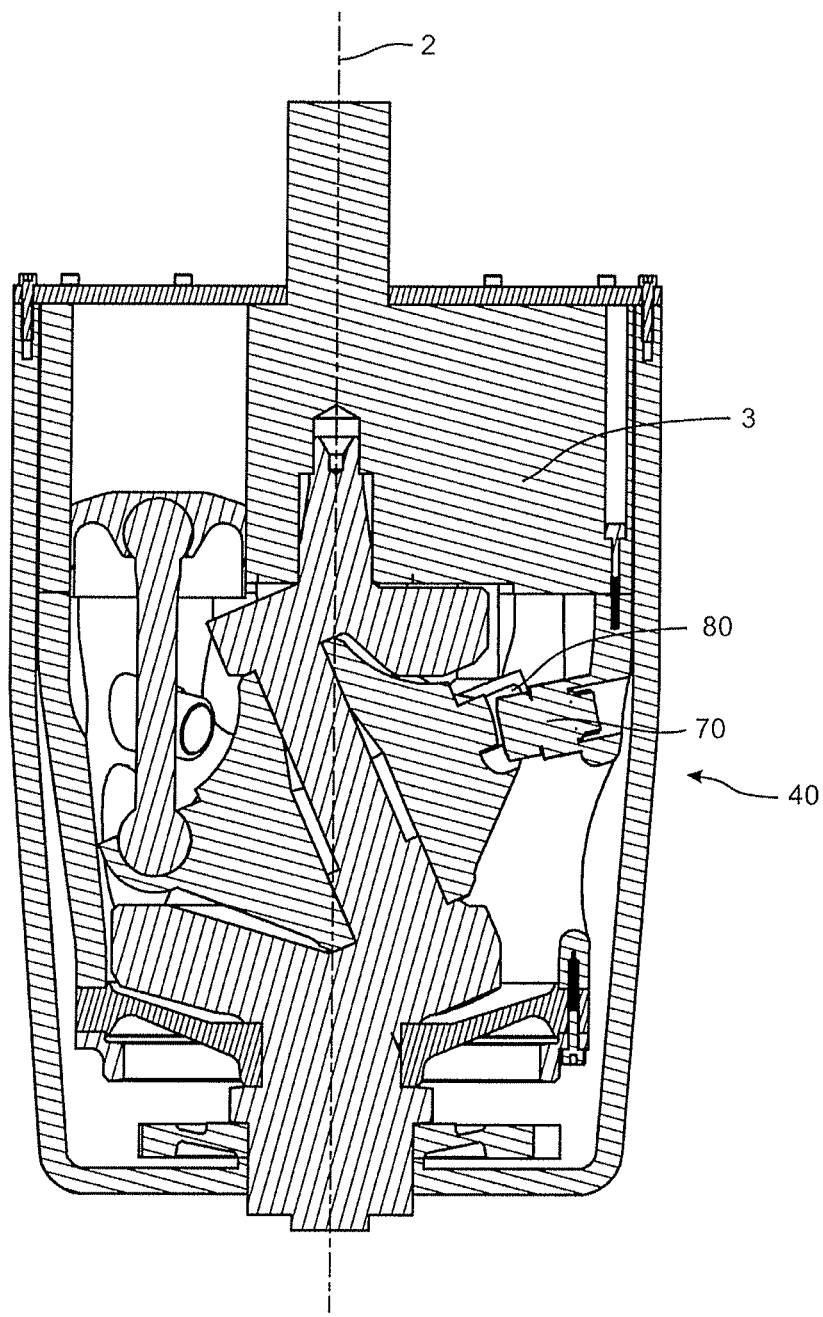
FIG. 5 shows the engine of FIG. 2 wherein a pair of rotation constrainers are shown in engagement with each other.
Figure 6:
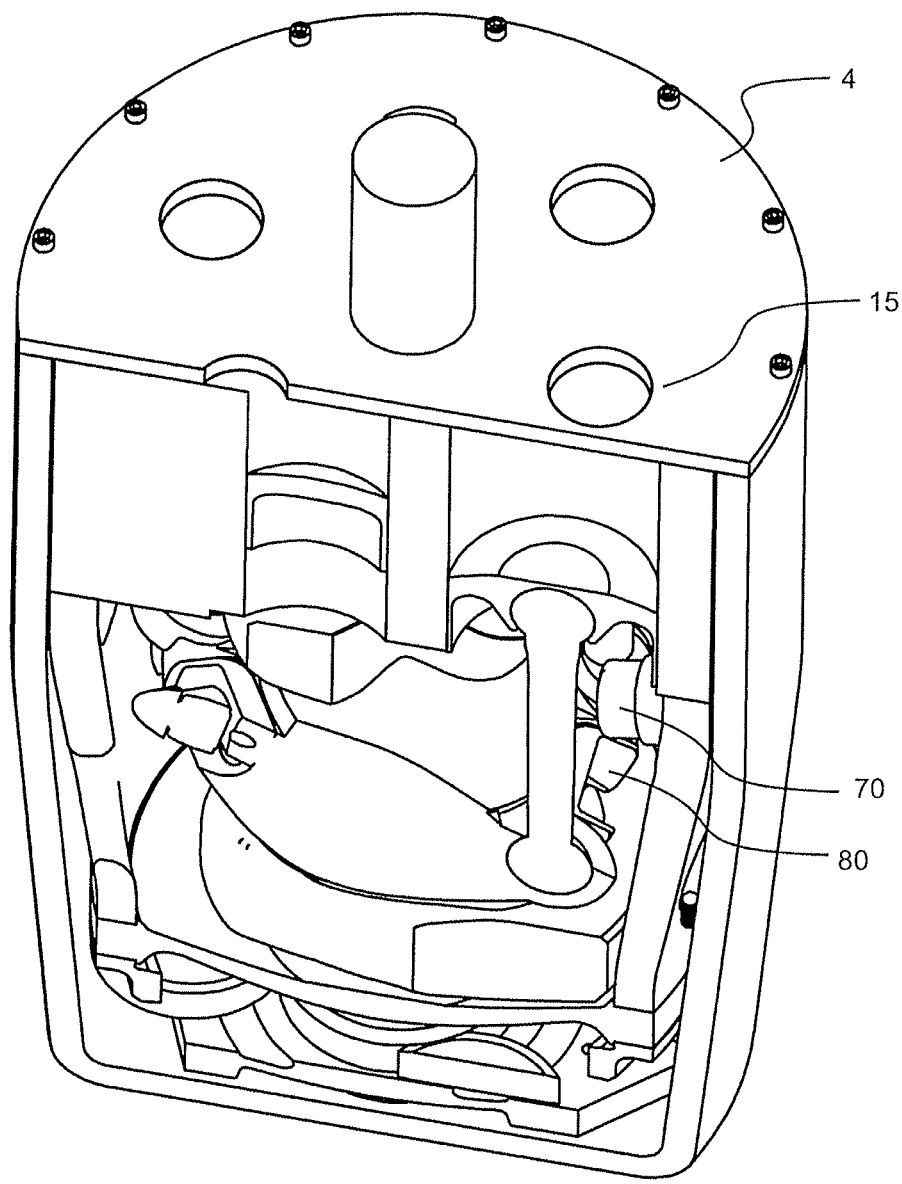
FIG. 6 is a cut-away perspective view of the engine in a position corresponding to FIG. 2.
Figure 7:
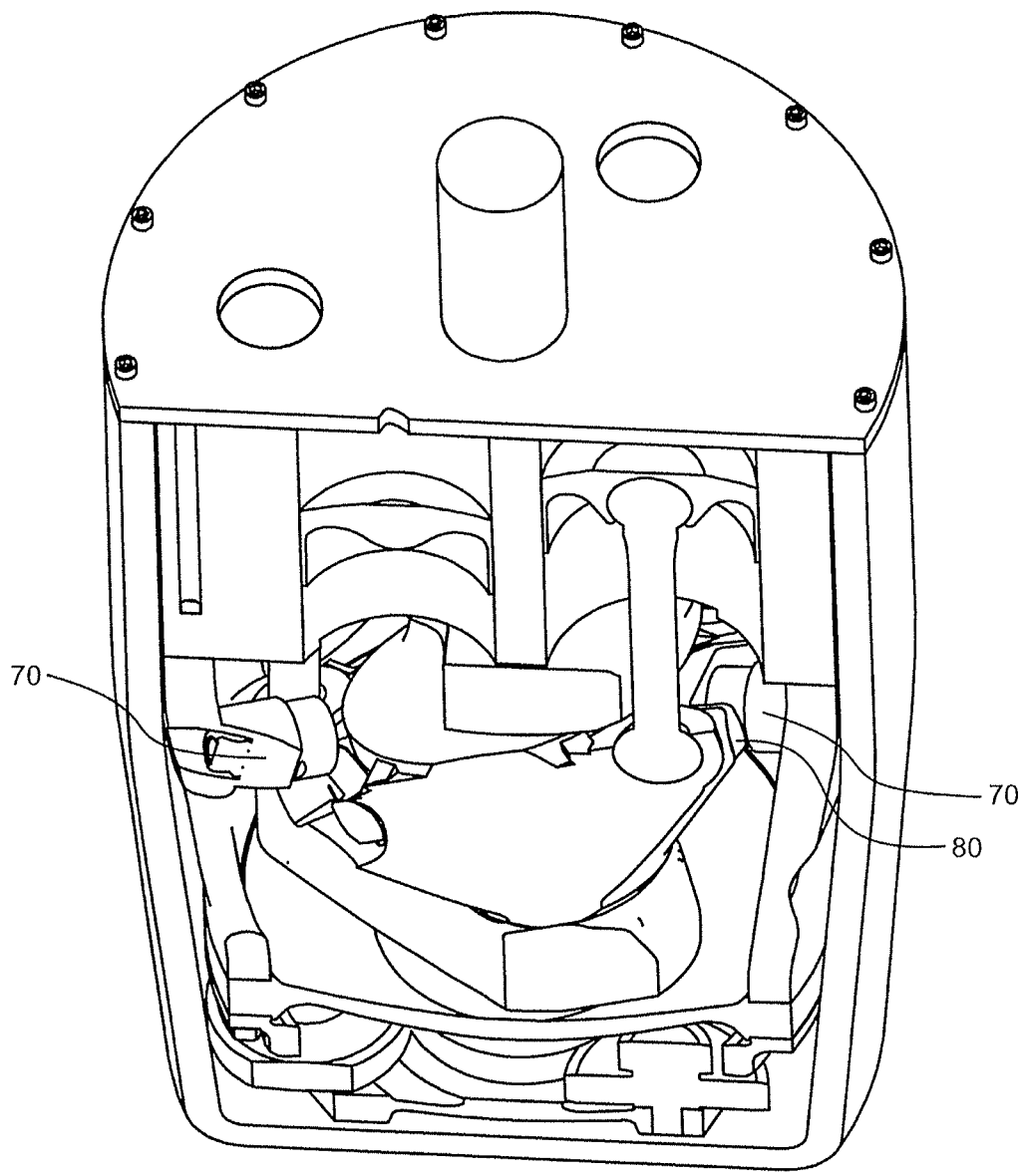
FIG. 7 is a cut-away perspective view of the engine in a position corresponding to FIG. 5.

Constraining the relative motion of the reciprocator 9 to cylinder cluster 3 is achieved by pairs of rotation constrainers 40, one such pair being shown in FIG. 5. These may also be herein referred to as nutator and stator elements.

Preferably the engine, when of an at least 5 cylinder configuration, has at least the same number of pairs of rotation constrainers as there are connections made to the reciprocator by connection rods. Hence in the form of the engine shown in FIGS. 2 and 4-7 there are 5 pairs of rotation constrainers 40. More may be provided for depending on the size of the engine.

Each pair of rotation constrainers 40 comprises of a first member 70 that is mounted with and preferably by the cylinder cluster 3 and a second member 80 that is mounted with and preferably by the reciprocator. These members ensure synchronisation between the cylinder cluster and the reciprocator. In the engine of a kind as per FIG. 2 where the cylinder cluster rotates relative to the ported member 4, the rotation constrainers ensure that the cylinder cluster and the reciprocator rotate synchronously relative to the ported member 4.

The radial distance from point X to each second member remains fixed. The motion of each second member can be traced on the surface of a notional sphere at a distance from point X herein referred to as the "reciprocator rotation constraint pitch spherical radius" or "reciprocator rotation constraint PSR". This is shown in FIG. 19 as PSR-1.

In the preferred form, the first and second members are a peg and cup respectively (or visa versa). These act as a cam follower and cam. In FIGS. 2 and 5 it can be seen that the first member is a peg 70 and the second member is a cup 80. Each peg 70, projects to present itself for intermittent engagement by its respective cup 80 as the reciprocator nutates about the crank axis 8.

Whilst the preferred configuration of the first and second members is a peg and cup respectively (or visa versa) other forms are envisaged such as a ball and socket or pin and socket. Each can allow the receipt of the other and release such that contact is intermittent.

During contact, the rotation of the reciprocator about the crankshaft axis is constrained relative to the cylinder cluster. The nature of the shape and positioning of the first and second members is such to achieve this constraint.

Sufficient numbers of pairs of rotation constrainers are provided to ensure that at any one point of nutation of the reciprocator, at least one pair or first and second members is operatively engaged. Preferably two are in operative contact most of the time.

Figure 8:
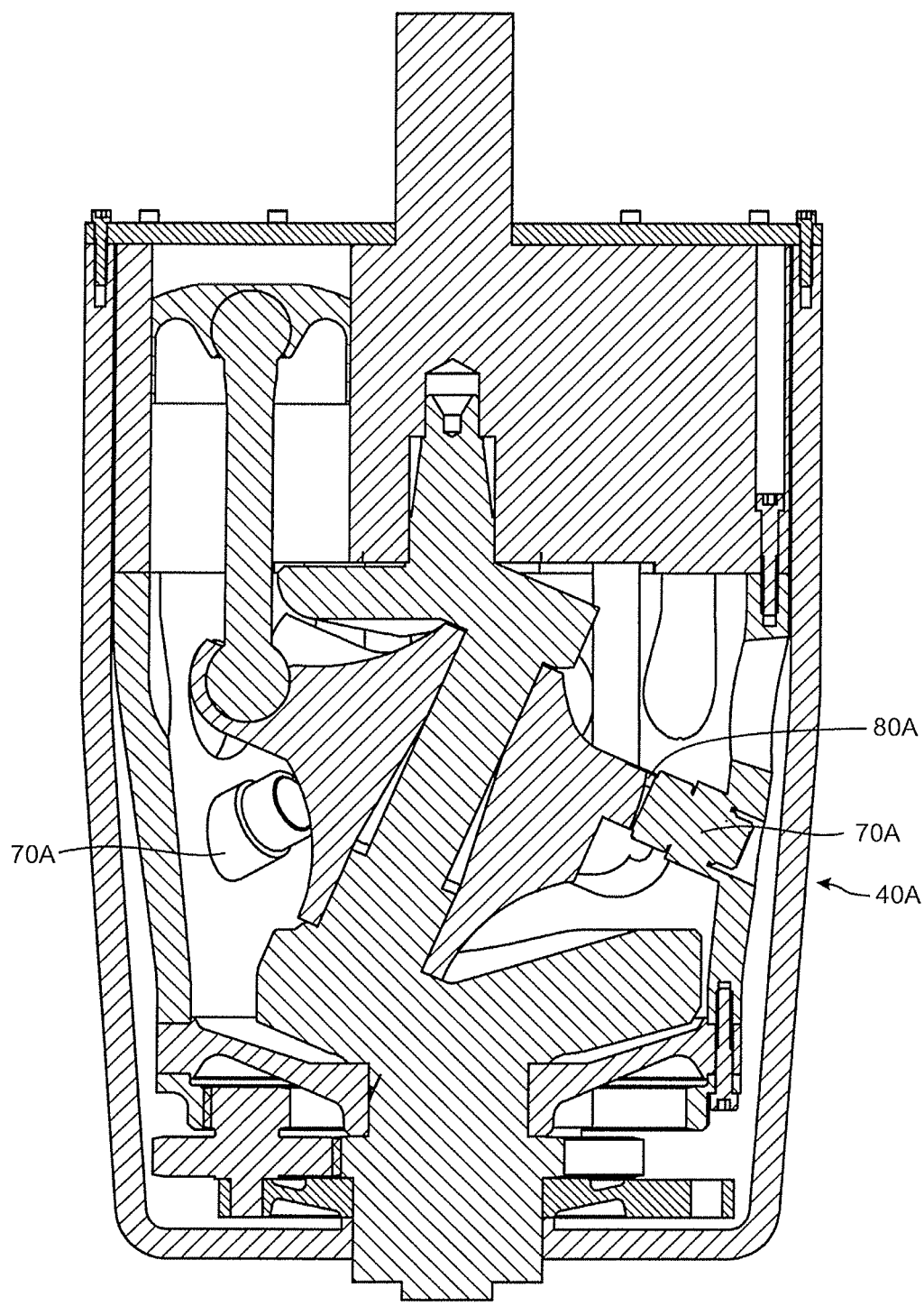
FIG. 8 shows a variation of the engine of the present invention wherein the rotation constrainers are positioned to engage at locations opposite to those of the engine of FIG. 2, FIG. 9, shows a variation of an axial piston machine where no indexing mechanism is provided but wherein port control is achieved by poppet valves.

In the preferred form, contact of a pair of rotation constrainers occurs, in the engine of FIG. 2, at locations substantially opposite to where a connection rod is located on the reciprocator when such is in the BDC location. An alternative is shown in FIG. 8 where the pairs of rotation constrainers 40A are positioned to each come into contact with each other when the opposite piston is in the TDC position. It will be appreciated that where there are even numbers of cylinders, the positioning of the rotation constrainers may not be such as to have a pair of constrainers immediately opposite a corresponding piston.

In the form of an engine as described in FIG. 2, the cylinder cluster 3 rotates relative to a ported member 4. The indexing of this rotation, to ensure appropriate timing of the cycle of engine when operating as a 4 stroke engine, with the position of the piston between TDC and BDC, can be achieved by an indexing mechanism 91. This may comprise of a sun gear 92, a planetary gear set 93 supported by carrier 95 and annular gear 94, similar to that described in WO2009022918 as will hereby be incorporated by way of reference.

Figure 9:
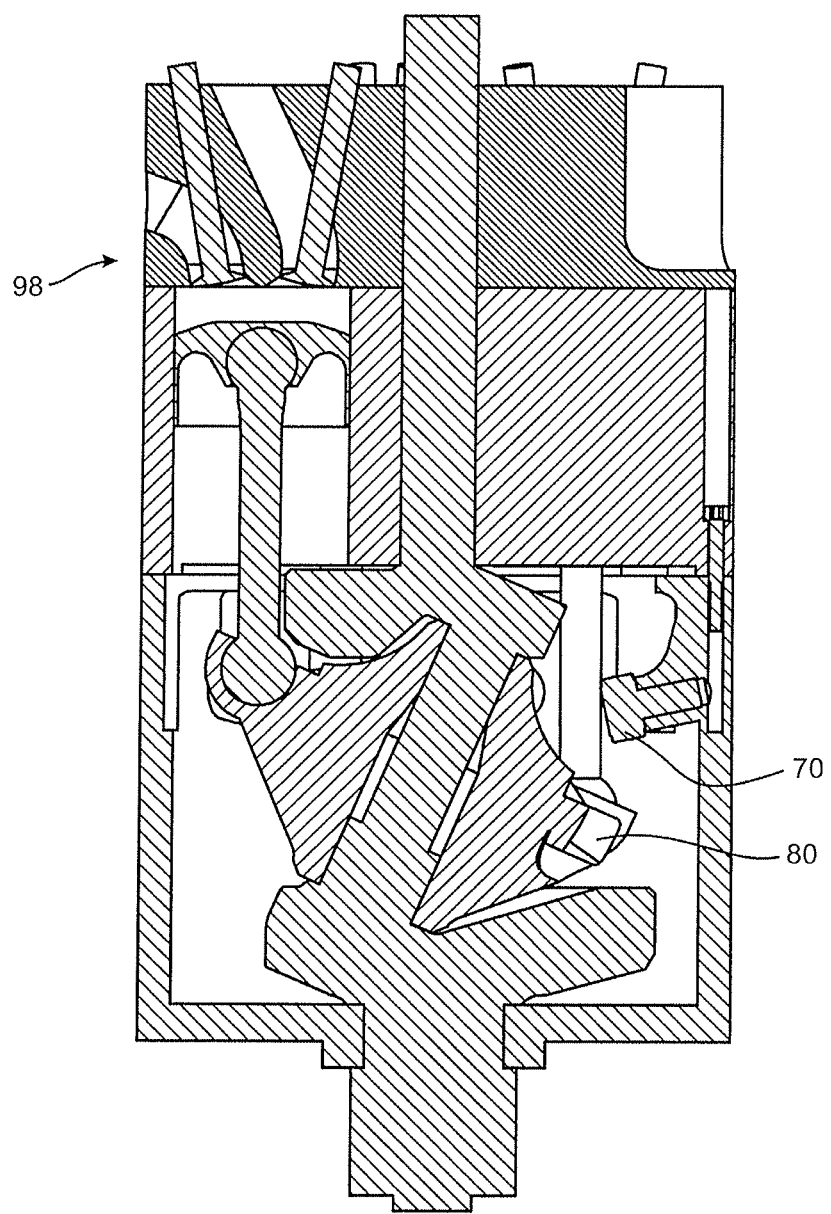

With reference to FIG. 9, there is shown an engine of the present invention wherein no indexing mechanism is shown to effect rotation of the cylinder cluster but wherein port control is achieved by for example poppet valves 98 that may be timed by an appropriate mechanism or electronics to allow the engine (or pump) of the present invention to operate. These operate to control the flow of fluid into and out of the cylinders.

For the preferred form of constraint between the reciprocator and the cylinder cluster to be homo-kinetic, the positioning of the rotation constrainers is important.

Figure 10:
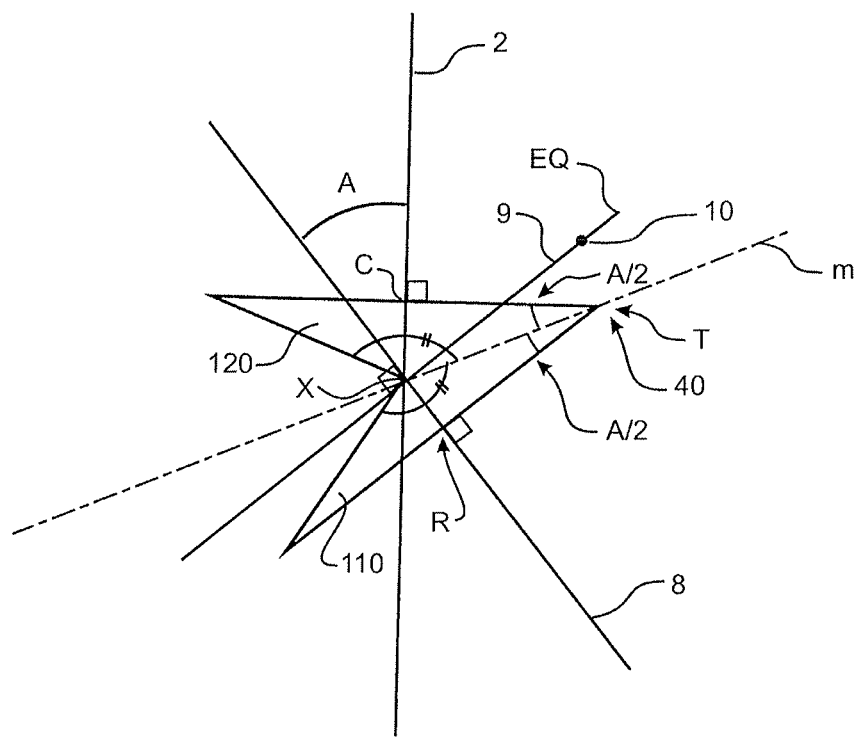
FIG. 10 is a diagrammatic illustration to show the contact points of two cones 120 and 110 at point T, defining that location where, as the cones rotate relative to each other, the pairs of rotation constrainers make full engagement with each other at the median line M, as per the engine of FIG. 2.

With reference to FIG. 10, which is a static line drawing illustrating geometry of the first preferred embodiment of the engine in the position shown in FIG. 5, contact is made by the pair of rotation constrainers 40 at point T.

Point T is equidistant from point C and point R, while point X is also equidistant from point C and point R. A line between point T and point C extends perpendicular to the crankshaft axis 2 at point C. A line between point T and point R extends perpendicular to the crank axis 8 at point R. With these geometric constraints, point T will always lie on the median line M. Median line M bisects the reflex angle between the crankshaft axis 2 and the crank axis 8 at point X. In other words, the median line M is the line passing through point X to which the line that bisects angle A is normal.

In other words, and dynamically, a notional cone 120 having its apex at point X and base perimeter coincident with the first member 70 is the same size and shape as the cone 110, having its apex at point X and base perimeter coincident with the second member. In a dynamic reference frame, the two cones will constantly be rotating relative to each other so the contact point T will be on the move all the time.

Figure 11:
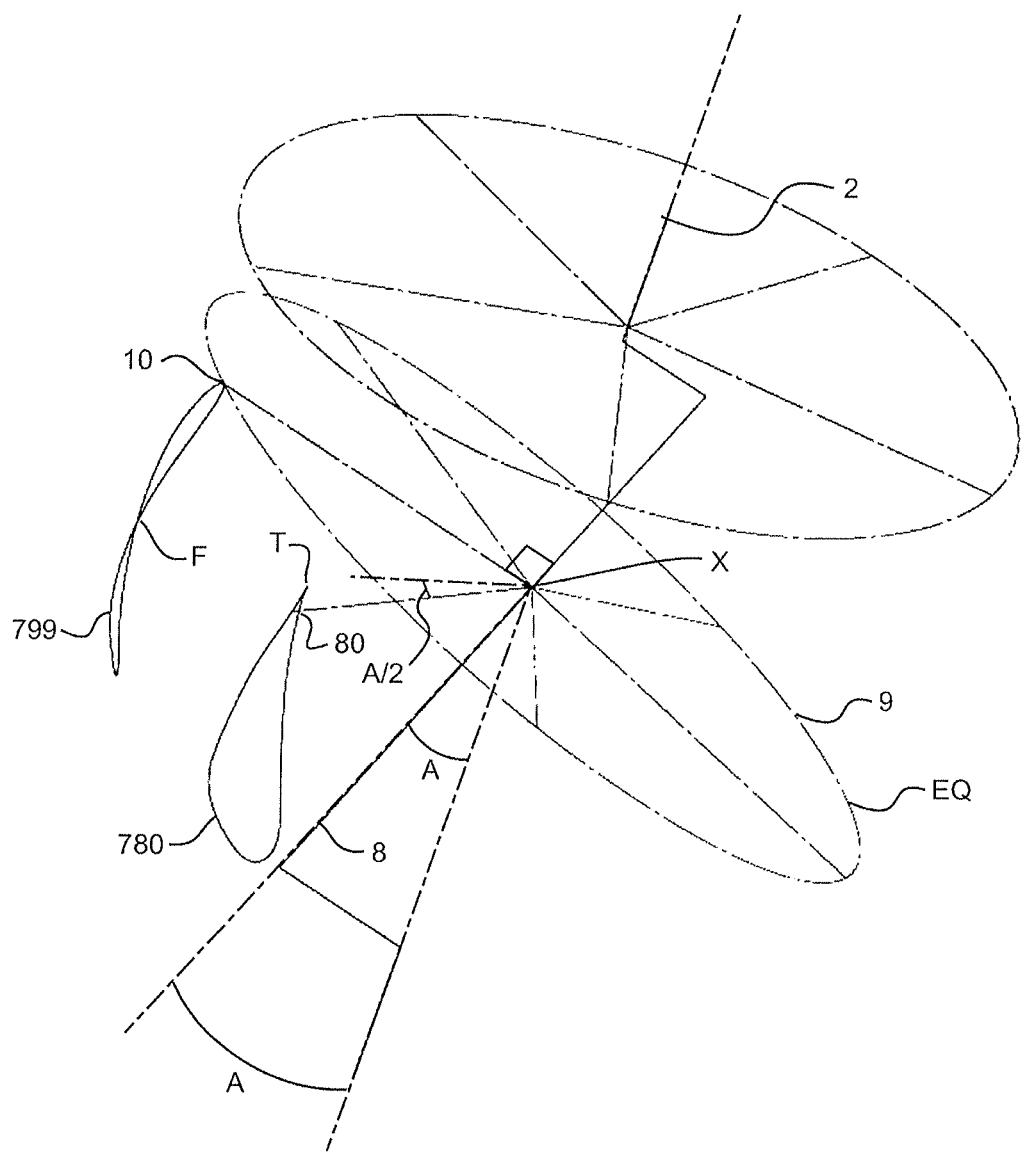
FIG. 11 illustrates further geometry in respect of the preferred location of the big end connection and the second member of the rotation constrainers with reference to the engine of FIG. 2 and the illustration of FIG. 10.

The resultant path that each second member 80 travels is the tear drop shaped path 780 as shown in FIG. 11.

In FIG. 11, the big end connection point 10 is shown positioned on the equatorial plane EQ. This is the preferred location of such as it ensures that path 799 is a symmetrical lemniscate. In FIG. 11, point 10 is shown corresponding to its cylinder being in TDC.

This equatorial position is the preferred location of the big end connection as it ensures close to sinusoidal motion of the piston in its cylinder. This reduces the prospect or magnitude of any $2^{nd}$ order (or higher) vibration harmonics.

In FIG. 11, the position of the reciprocator 9 is such as to position the second member 80 just advanced of or prior to its point of full engagement with the first member (not shown) at point T, when the big end connection 10 is at a position corresponding to TDC of its associated piston.

Figure 12:
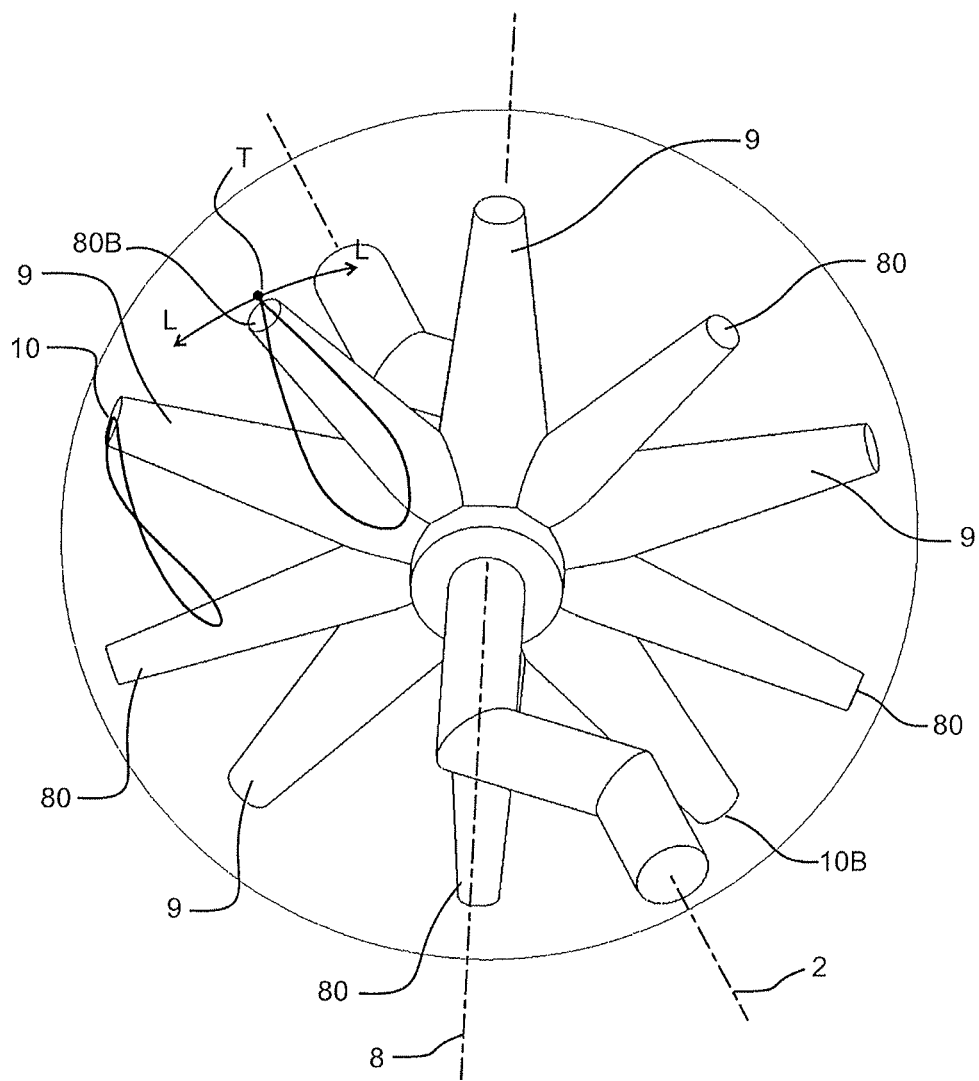
FIG. 12 is a diagrammatic illustration showing certain features of a reciprocator and loci traced by points thereon.

With reference to FIG. 12, multiple second members 80 are shown carried by the reciprocator. Second member 80B is shown at a position corresponding to full engagement with a first member (not shown) when the big end connection point 10B, opposite, is in a position corresponding to the associated piston (not shown) being at BDC.

As the reciprocator nutates, sequentially each second member comes into and out of engagement with its corresponding first member. At any one time, at least one pair of rotation constrainers is in operative engagement with each other. Preferably at least 2 rotation constrainers are in engagement at any one time to prevent large amounts of backlash, as each engaged pair contact in one direction only (apart from fully engaged position).

Where the engine has a large crank angle A or has few pistons, more than one second member may need to be placed intermediate of each big end connection 10, each with a corresponding first member carried by the cylinder cluster. Where the engine operates with 5 cylinders then 5 second members could be utilised.

Each pair of first and second members of the rotation constrainers contact each other only once per revolution of the cylinder cluster. As a pair of first and second members move towards coming out of engagement, the intermediate piston proceeds to TDC and which is reached before the next pair of first and second members come into full engagement.

As this next pair move towards full engagement, the piston moves away from TDC and towards BDC. In this way it can be appreciated that during nutation, motion of a piston, then a rotation constrainer then the next piston, then the next rotation constrainer etc, sequentially reach one of its two limits of motion.

Engagement occurs at and about the apex T of the locus traced by the second members. As such, motion of the second members relative to the first members is substantially only in a longitudinal direction (that being referenced in relation to the sphere of FIG. 4 with poles at P). This allows for the cup to be shaped to allow for entry and exit of the peg in a manner that has close tolerances.

Figure 13:
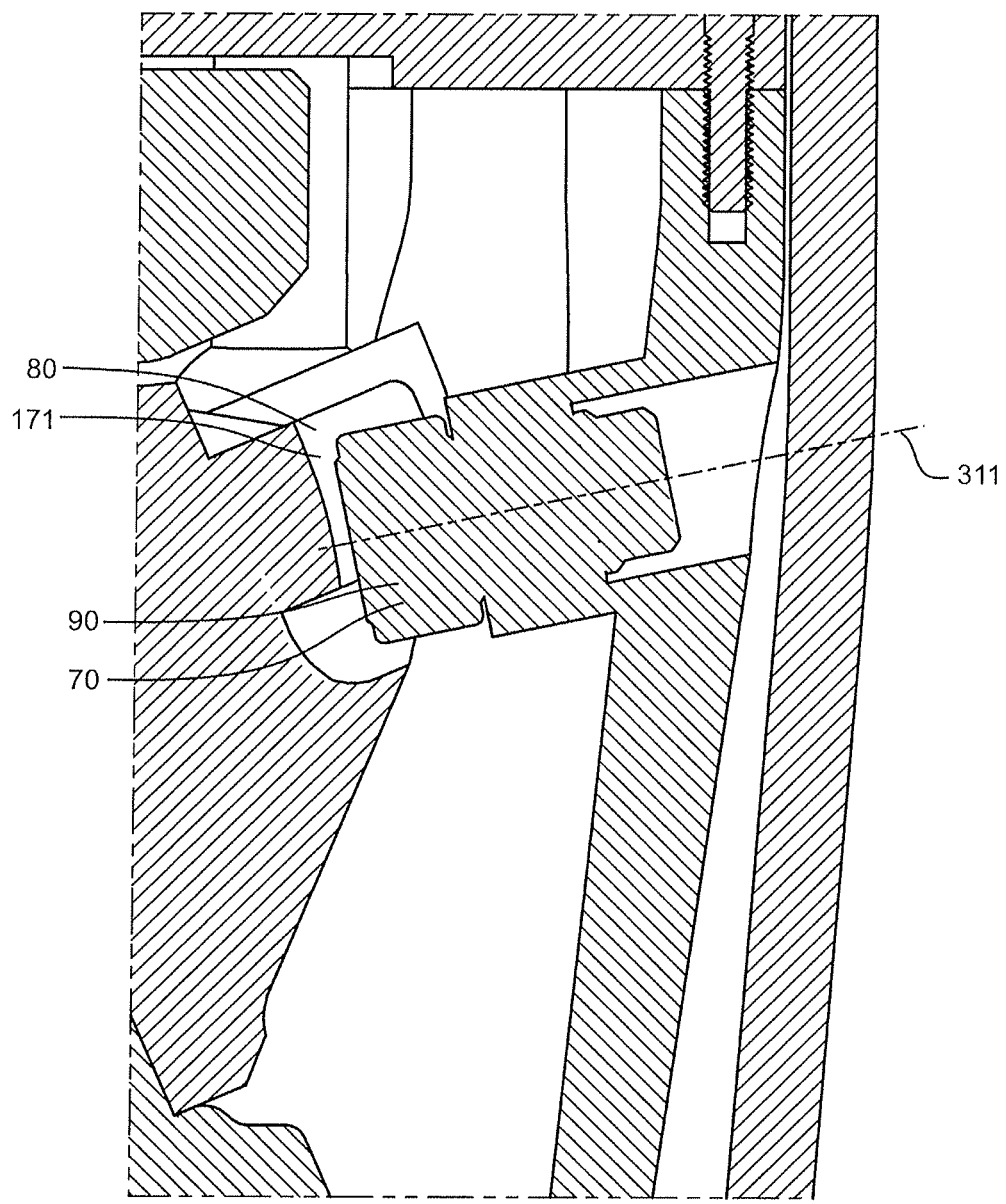
FIG. 13 is a close up sectional view of a peg and cup form of a rotation constrainer in an engaged condition.
Figure 14:
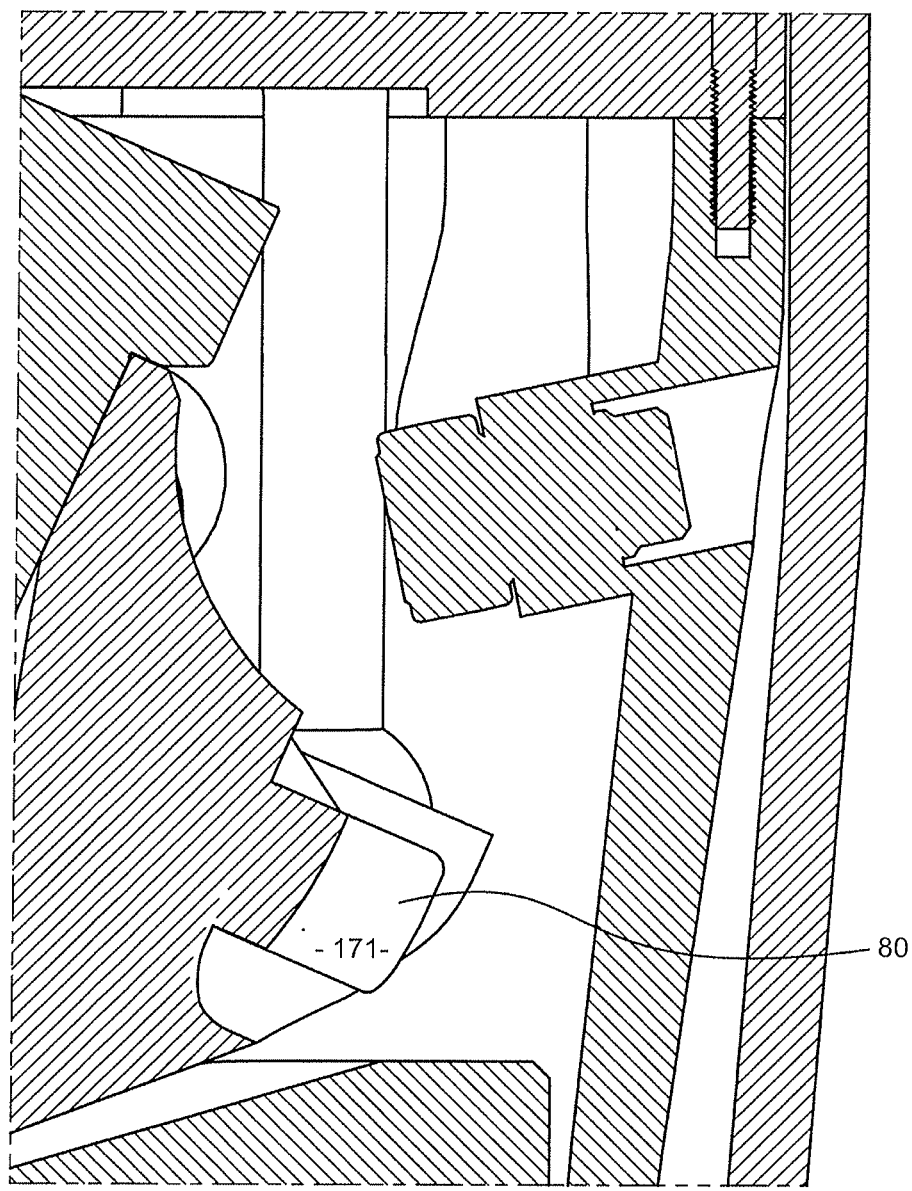
FIG. 14 is a close up sectional view of a peg and cup of a rotation constrainer in condition opposite is fully disengaged condition.
Figure 15:
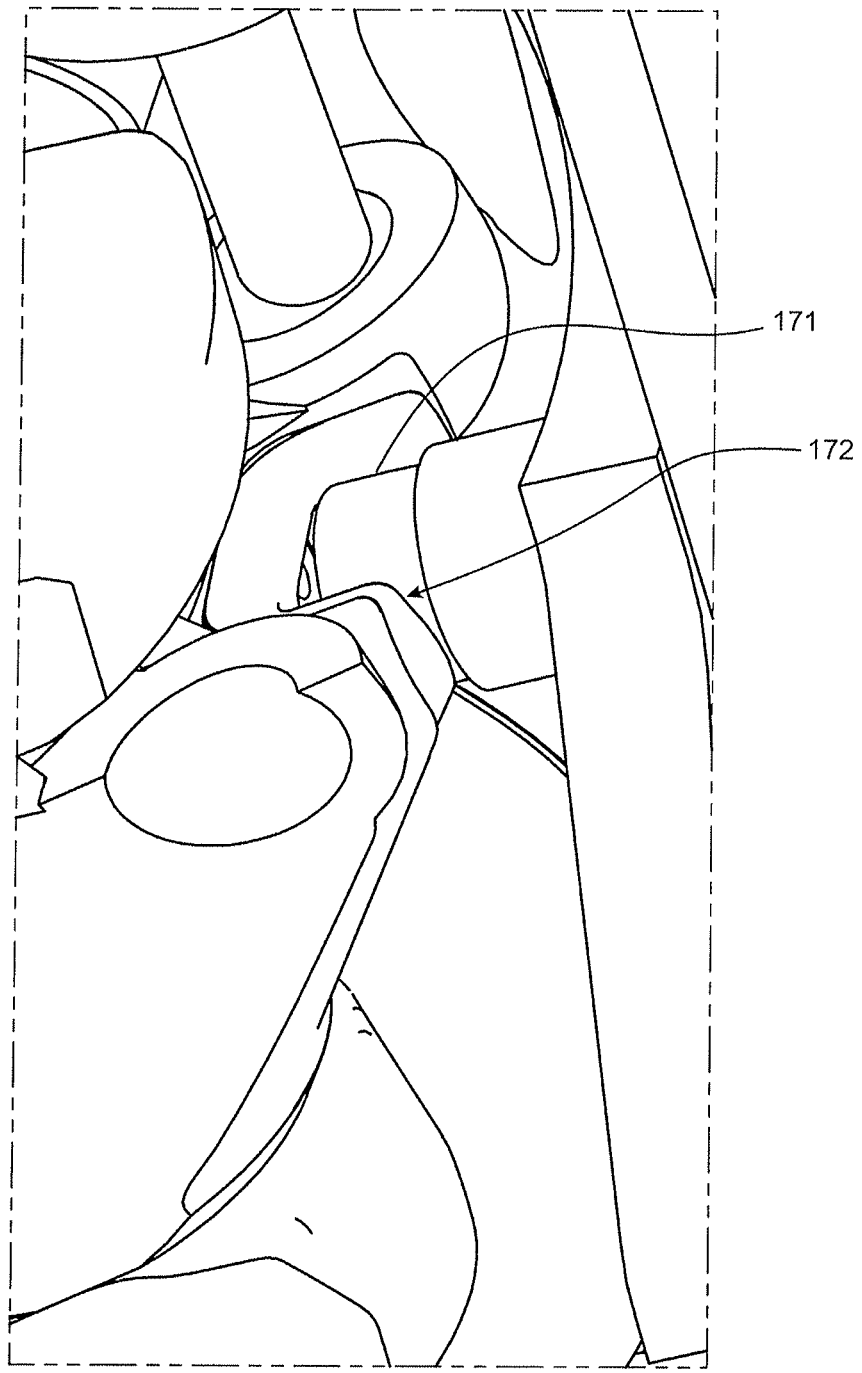
FIG. 15 is a close up perspective view of a peg and cup of a rotation constrainer in an engaged condition.
Figure 16:
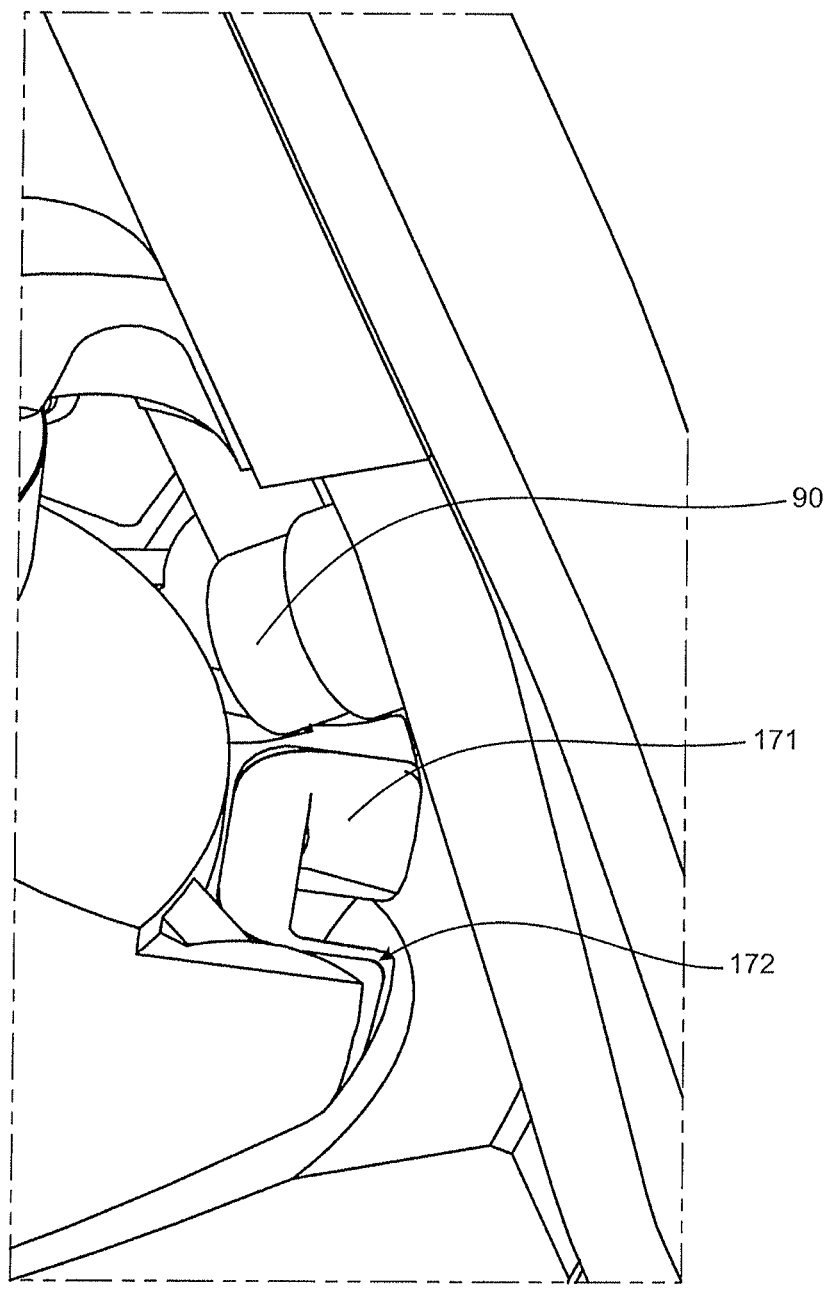
FIG. 16 is a close up sectional view of a peg and cup of a rotation constrainer in a disengaged condition.

FIGS. 13-15 show the peg and cup of one pair of rotation constrainers.

The peg 70 preferably comprises a roller 90 that is mounted for rotation about the axis 311. Use of a roller is beneficial as it increases fatigue life and reduces friction. This is because the roller is unlikely to be in the same rotational position each time it is in full engagement with the cup, and the roller is free to rotate about its axis.

Figure 17:
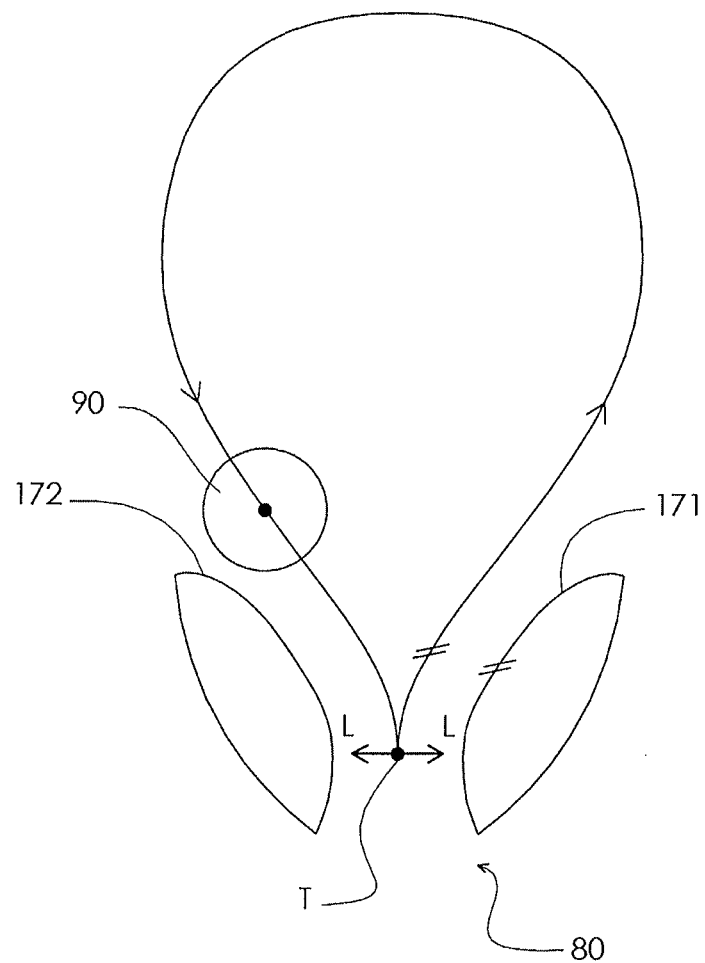
FIG. 17 is a diagrammatic illustration of the locus of the second member of the rotation constrainer, and its relationship with its first member.

The cup, as seen in FIG. 17, comprises of at least two reaction surfaces 171 and 172 that are presented to transfer loading in a direction L-L, tangentially about the crank axis.

At any one time (other than preferably at point 1), only one reaction surface 171 or 172 is on contact with a corresponding roller 90. At point T, and preferably instantaneously, both reaction surfaces 171 and 172 are in contact with the roller.

At any one time, a roller is pushing or being pushed by one of the reaction surfaces 171 and 172.

The reaction surfaces are complementary to the path that the peg/roller takes. Gradual contact can hence be made by the peg on entry to the cup with the reaction surface 172. Continuing along the path, the peg transfers to the reaction surface 171 when the peg reaches point T of its locus. The peg then exits the cup, running along reaction surface 171. Such exit also being gradual.

The cup comprises reaction surfaces that are of a shape to ensure long enough operative contact of the peg with the cup, such that prior to and before contact (and/or at least during initial of final contact), another peg and cup are in operative engagement to ensure rotation constraint. Preferably two pairs of rotation constrainers are in operative contact at any time to avoid backlash.

The reciprocator may carry the cups (as shown), or the pegs.

Positioning the reciprocator peg (or cup as the case may be) at a location corresponding to the median line M will ensure a tear drop shaped locus. Positioning such away from the median line and closer to the equatorial plane will result in a more figure of eight motion, such being symmetrical when at the equatorial plane. However any deviation away from the tear drop shaped locus is undesirable from the point of view of simplicity of design of the shape of the cup and peg.

It is beneficial to have the cup and peg engage at the trailing end as the apex of the locus as at such, it will not have to accommodate any lateral motion and the velocities the cup and peg must deal with during the engagement are significantly reduced.

The equations governing the locus of the second member (ie that carried by the reciprocator) is $$z^2 = r^2 - x^2 - \left[\frac{r}{2}\left(K - SH^3 + \frac{1}{K}\right) + xH^3 - \frac{x^2}{2rK^3}\right]^2$$

Where, $$S = \sin\left(\frac{\text{angle } A}{2}\right)$$

$$K = \cos\left(\frac{\text{angle } A}{2}\right)$$

$$H = \tan\left(\frac{\text{angle } A}{2}\right)$$

$r$ = radial distance from point $X$ to the second member

The equation represents the locus of the second member, projected on the x-z plane, axis x being coaxial to the crankshaft axis, axis y being perpendicular thereto and z also perpendicular thereto and perpendicular to the y axis, all passing though "Point X".

As can be seen in FIG. 12, the plurality of second members (the parts of the rotation constrainers carried by the reciprocator) are provided in an intermittent sequence.

These second members are positioned intermediate of the adjacent big end connection points 10.

Figure 18:
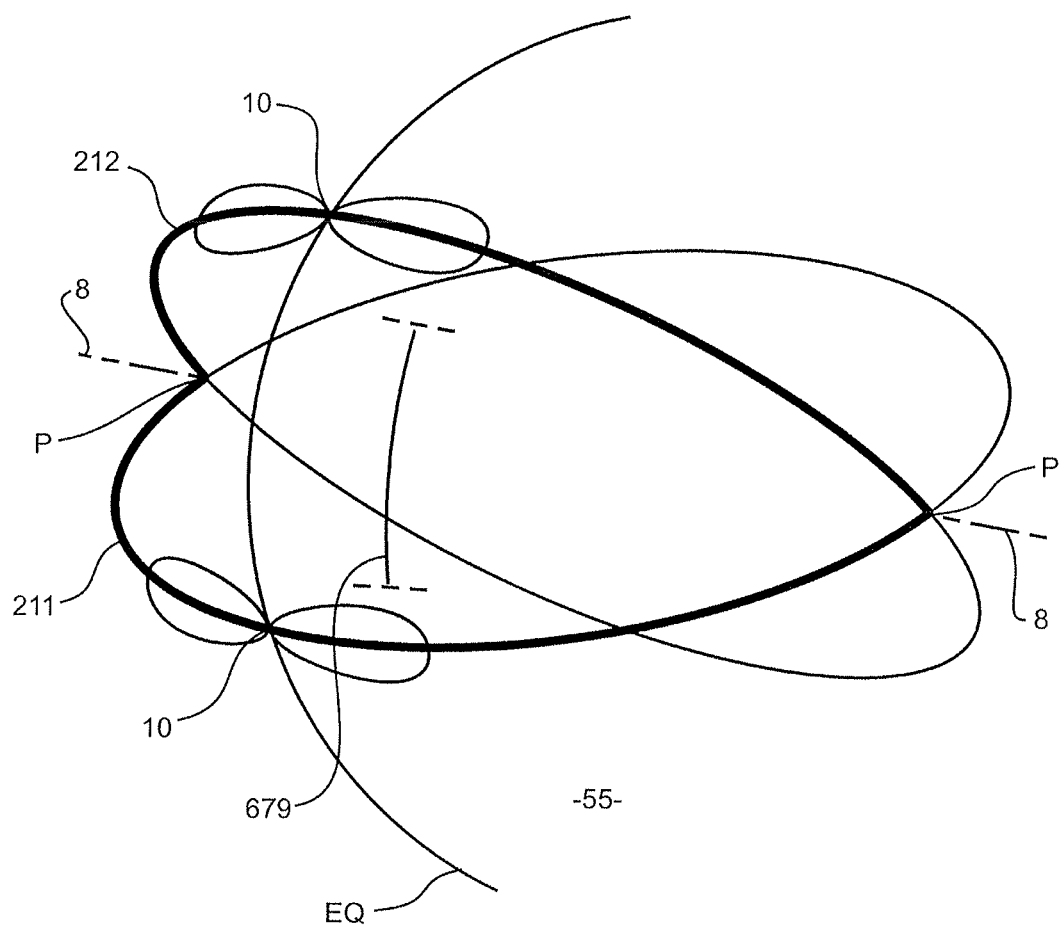
FIG. 18 illustrates a Lune of the sphere on the centreline of the locus of adjacent big end connection points, to illustrate the preferred position of the second members being intermediate of the semi-circles defining the lune (whether on the lune surface or near it)

With reference to FIG. 18, a Lune of the Sphere 55 is shown. This is defined and bounded by two great circles 211 and 212 (with their semi-circles in bold) that represent the mean axis of motion of the big end connection points 10, to and from the poles P, of two adjacent connection rods (and where such are positioned at the equatorial plane). In one preferred embodiment, the second members are preferably located intermediate of the great circles 212 and 211 bounding the Lune. Such may preferably be located at or proximate the Lune surface or radially in or outside thereof. Preferably the second member is located equidistant from both great circles. And preferably on the median plane. Arc 679 shows by way of example the range in which a second member may be located without interference from the connection rods or big end connection of adjacent connection rods, yet still be at a distance from point X that could allow for such clashing to occur.

Such positioning intermediate of adjacent big end connection points 10, allows the distance from point X of the second members to be selected free from interference by the connection rods. In this way, the second members may be located at a distance from point X close or at the distance that the big end connection points 10, are from point X. In other words, the connection rod PSR may be the same or of the same order as the reciprocator rotation constraint PSR.

In FIG. 19 there is shown this preferred relationship.

Engines, particularly those that operate under high loads or at high speeds, present a unique set of problems to overcome as outlined above.

Figure 20:
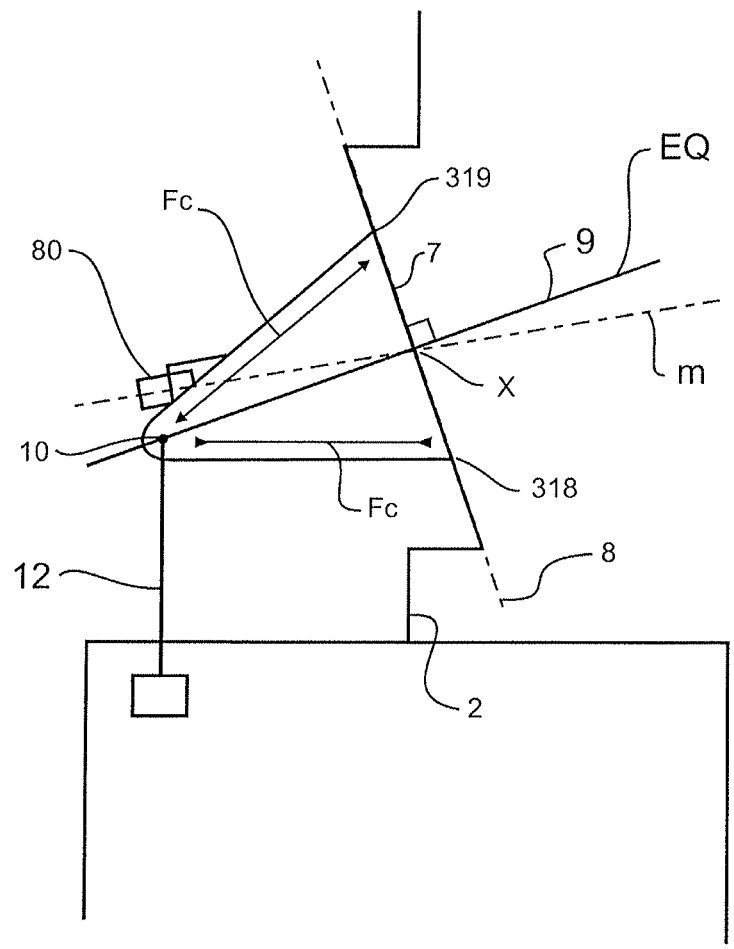

As can be seen in FIG. 20, positioning of the second members in an intermittent manner, yet still operative at a distance from point X commensurate to that of the big end connection point 10, allows for:
1. freedom of construction of the reciprocator for the purpose of load transfer to (or from) the crank 7 as the forces Fc are able to be applied to the cranks 7, via the bearing 318 and 319 in a direct manner, and
2. freedom of design of the connection rods, rotation constrainers and big end connection due to them not being in locations that can clash with each other.

Figure 27:
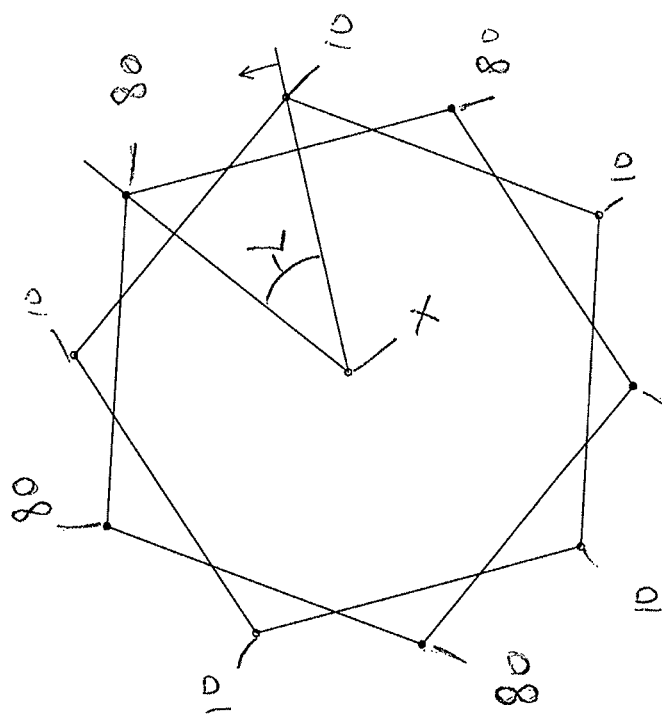
FIG. 27 shows schematically the location of connection rods to reciprocator connection points, overlayed with second member location points to show that such are located mid way between adjacent connection rods to reciprocator connection points, and FIG. 28 show the illustration of FIG. 27 but wherein the connection rods to reciprocator connection points is shifted or biased more towards one of an adjacent pair of second members.

As can be seen schematically in FIG. 27, second members are members located midway between the big end connection to the reciprocator. This is the preferred form of construction. However, it is envisaged that there may be a bias one way of the other. This may be useful to reduce the contact force/stress by changing the phase of restraint ie when the first and second members come into contact relative to the firing of the piston in the cylinder.

In the preferred embodiment of the invention where the engine is designed for high speed operation, having the distance from point X of the second members 80 commensurate, allows for a compact internal combustion engine to be designed that can operate at high rpm.

This provides the ability to balance 4 important factors namely speed, inertia that are compromised when the rotation constraint occurs at positions further away from point X and strength and rigidity when closer to point X.

With reference to FIGS. 21-24 there is shown a two series of rotation drivers 609 that may be provided as an alternative to the drive mechanism shown with reference to FIG. 2.

The drive mechanism of FIG. 21-24 are comprised of a first series of drive members comprising individual discrete drivers elements 610 that are spaced apart and located about the crankshaft axis 2. These may, like the rotation constrainers, be comprised of a cup or socket and pin or peg or ball or similar.

The first series of drive elements are preferably engaged to and/or affixed or integrally formed with the engine housing and hence rotationally stationary to the ported member 4.

Carried by and preferably affixed with or to the reciprocator is the second series of drive members comprising of individual drive elements 611. These are able to engage with the driver elements 610 of the housing in a manner similar to those of the rotation constrainer members. The drive elements 611 may each be comprised of a cup or socket and pin or peg or ball or similar that is complementary to those of the drive elements 610 so as to be able to come into and out of engagement therewith.

Rotation of the ported member and reciprocator can be indexed relative to each other using two series of rotation drivers. In the preferred embodiment the first series of rotation drivers mounted to the reciprocator and comprising N number of driver elements 611. The second series of rotation drivers mounted to the ported member and comprising N' driver elements. Wherein the relationship between N and N' is governed by the following equations.

$N = Cyl_{number} \times I$ $Cyl_{Number}$ = the number of cylinders in a cylinder cluster $I$ = the ratio of rotation drivers to cylinders $N' = N \pm I$ The result is a stepping motion, effected by the difference in the numbers of drive elements between the first and second series and hence establishes the desired indexing.

The indexing function is not homo kinetic but constant differential velocity as the required rotation is not 1:1 (but for example −1/cyl number). The basic roller and cup geometry obeys the same framework of behaviour as that of the rotation constrainers but the meshing point is not on a median line. Instead it is at a mutual point on cones of N/N' circumference ratio with their apexes at point X.

Figure 22:
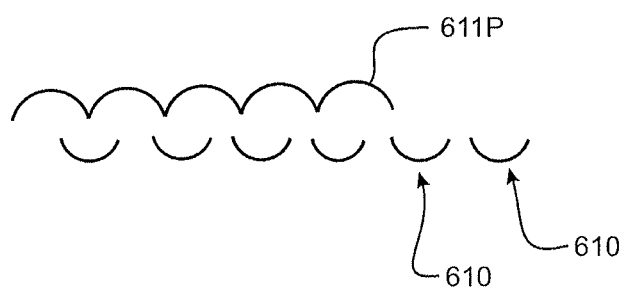
FIG. 22 shows a schematic of the number of elements of the indexing drive.
Figure 23:
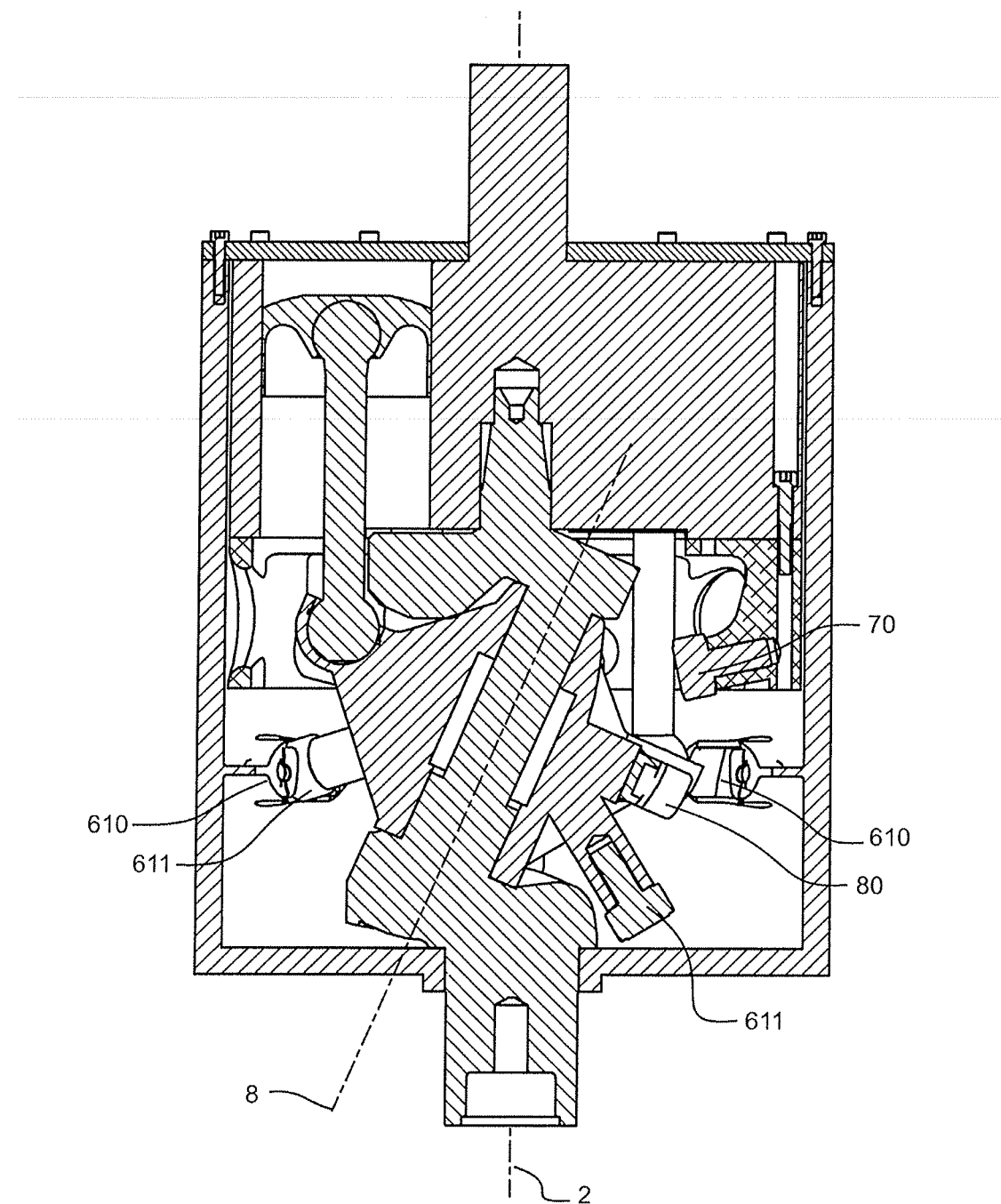
FIG. 23 is a cross sectional view, crank rotated compared to that of the engine of FIG. 22.
Figure 24:
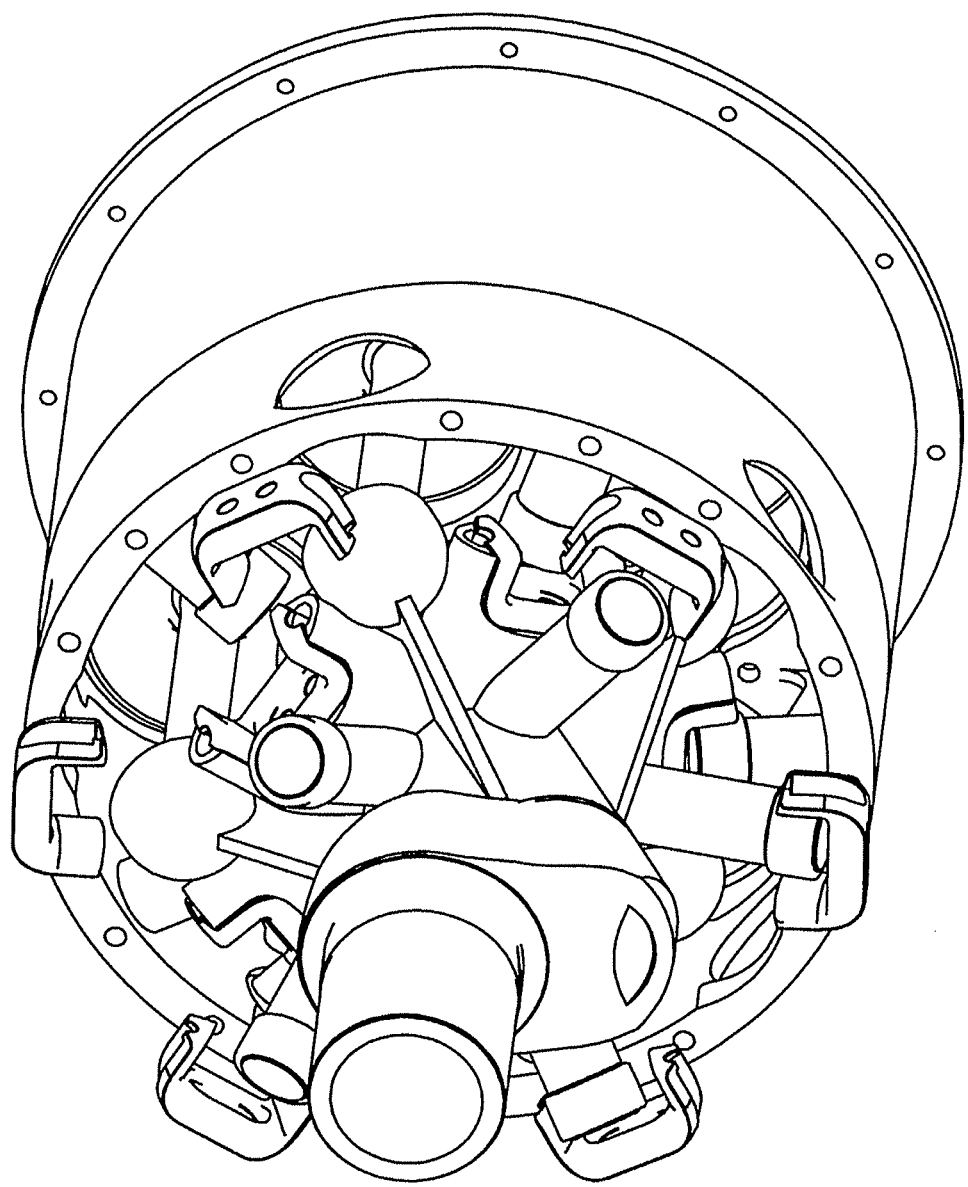
FIG. 24 is a perspective view of that of FIG. 22.

FIG. 22 shows the path 611P followed by a driver element 611 in relation to the driver elements 610.

Figure 21:
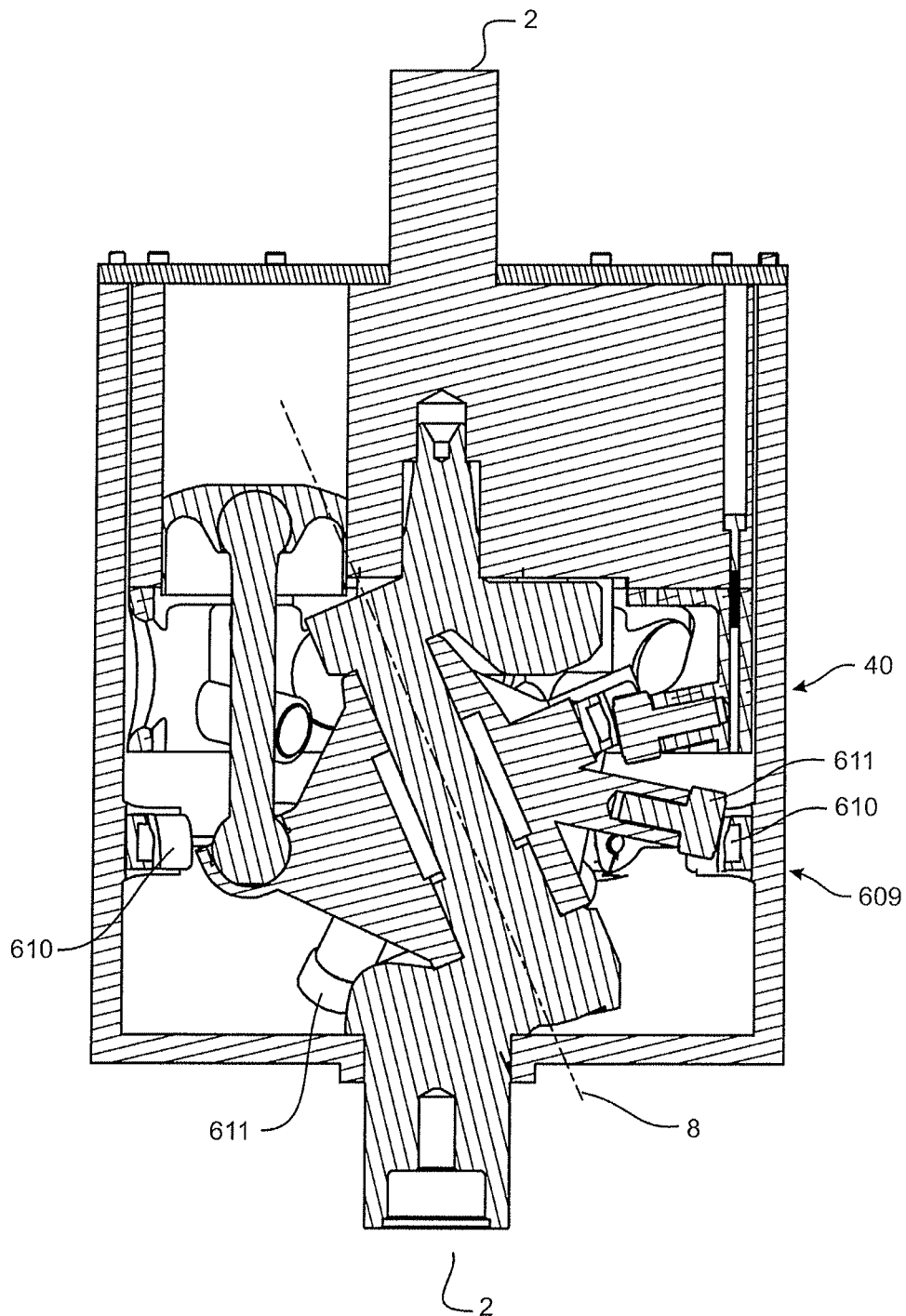
FIG. 21 shows a further variation of the engine of the present invention wherein an indexing drive different to that shown in FIG. 2 is provided.

Contact between a pair of indexing drive elements occurs when the most proximate second member of the rotation constrainers is also engaged with it respective first member as shown in FIG. 21.

The preferred indexing mechanism as herein described may be utilised independently of whether the preferred rotation constraint mechanism as herein described is utilised.

Figure 26:
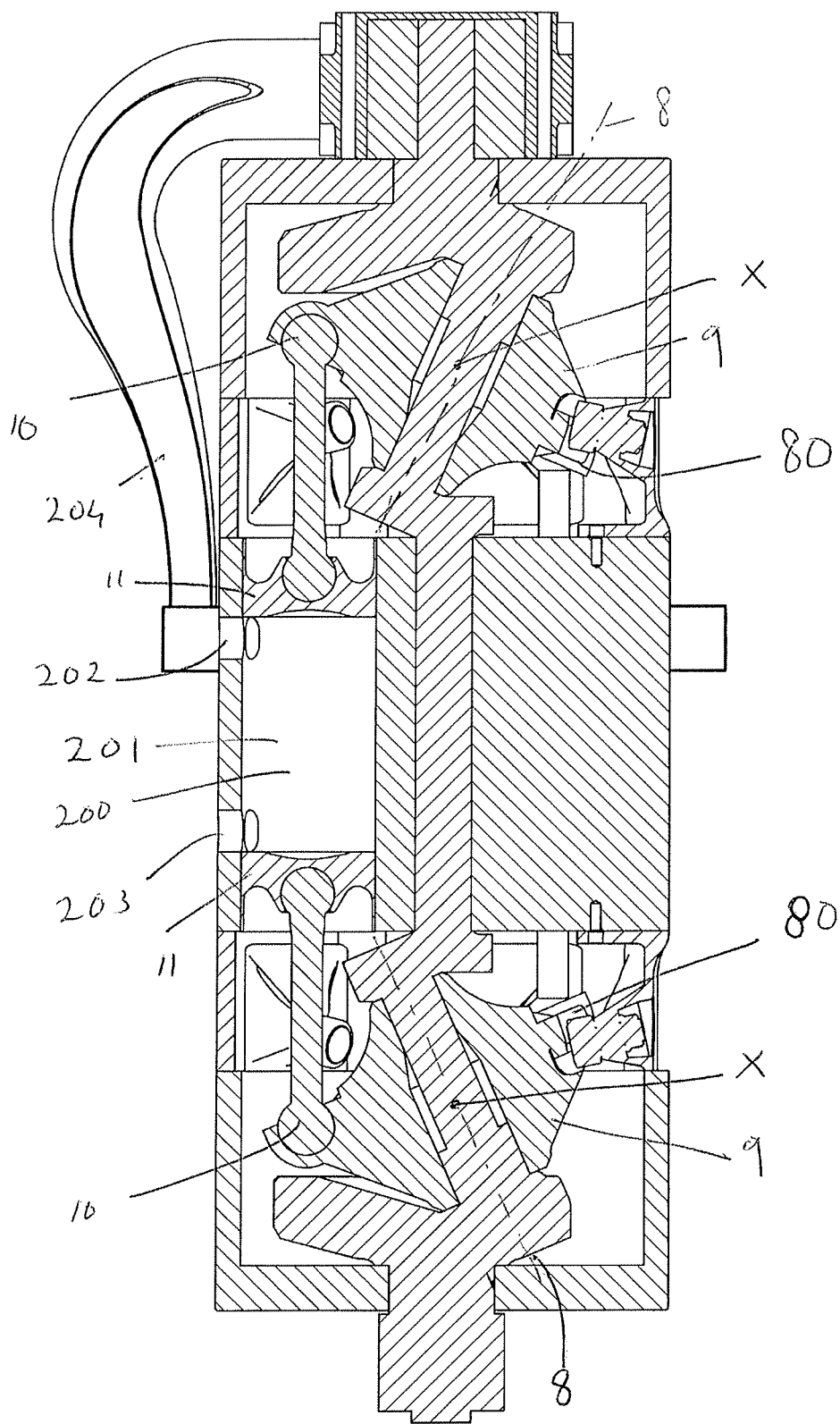
FIG. 26 is a cross sectional view of an opposed piston internal combustion engine incorporating a pair of reciprocators and a pair of rotation constrainers for each reciprocator, where each pair of rotation constrainers are located at either end of the cylinders.
Figure 28:
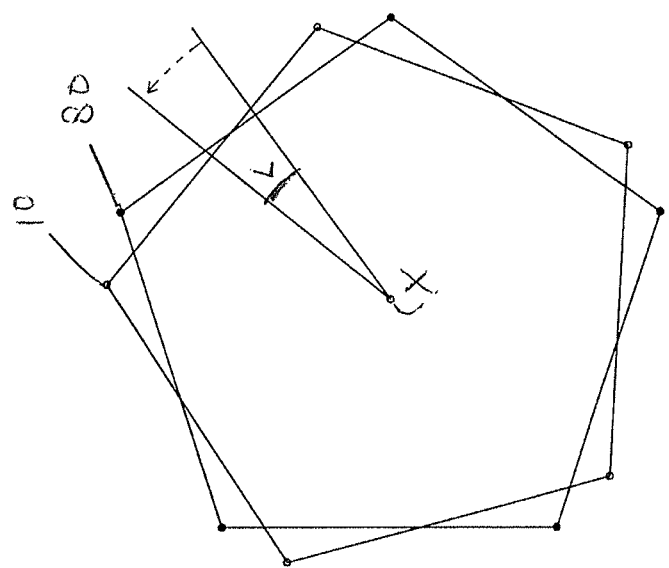

The machine according to FIG. 26 is able to operate as a 2 stroke opposed piston internal combustion engine, utilising a plurality of combustion chambers 200 each being defined by for example a cylinder mounted in an engine body and arranged on a PCD around a crankshaft axis. Both reciprocators 9 each have their own crank axis 8 and each reciprocator is located at either end of a cylinder in which two pistons 11 reciprocate forming a working volume 201. At least one pair of rotation constrainers are provided for each reciprocator.

Each cylinder is provided with at least one intake port 202 and at least one exhaust port 203 where with the utilisation of a nominal intake pipe 204 to a super charger (not shown) the super charger forces the induction of fresh charge and to scavenge exhaust gases during the combustion cycle. So during use as the pistons are forced together (preferably in phase but variation in phase could exist) the working volume is reduced, a means to introduce fuel and provide for ignition of the air-fuel mixture is provided, the resulting combustion acting on the pistons to provide useful work. The operating cycle may be compression or spark ignited. As the pistons reciprocate across the intake and exhaust ports, the pistons provide a valving function to the ports. Other forms of valving could be implemented. It could be a 2 stroke of a 4 stroke engine.

Figure 25:
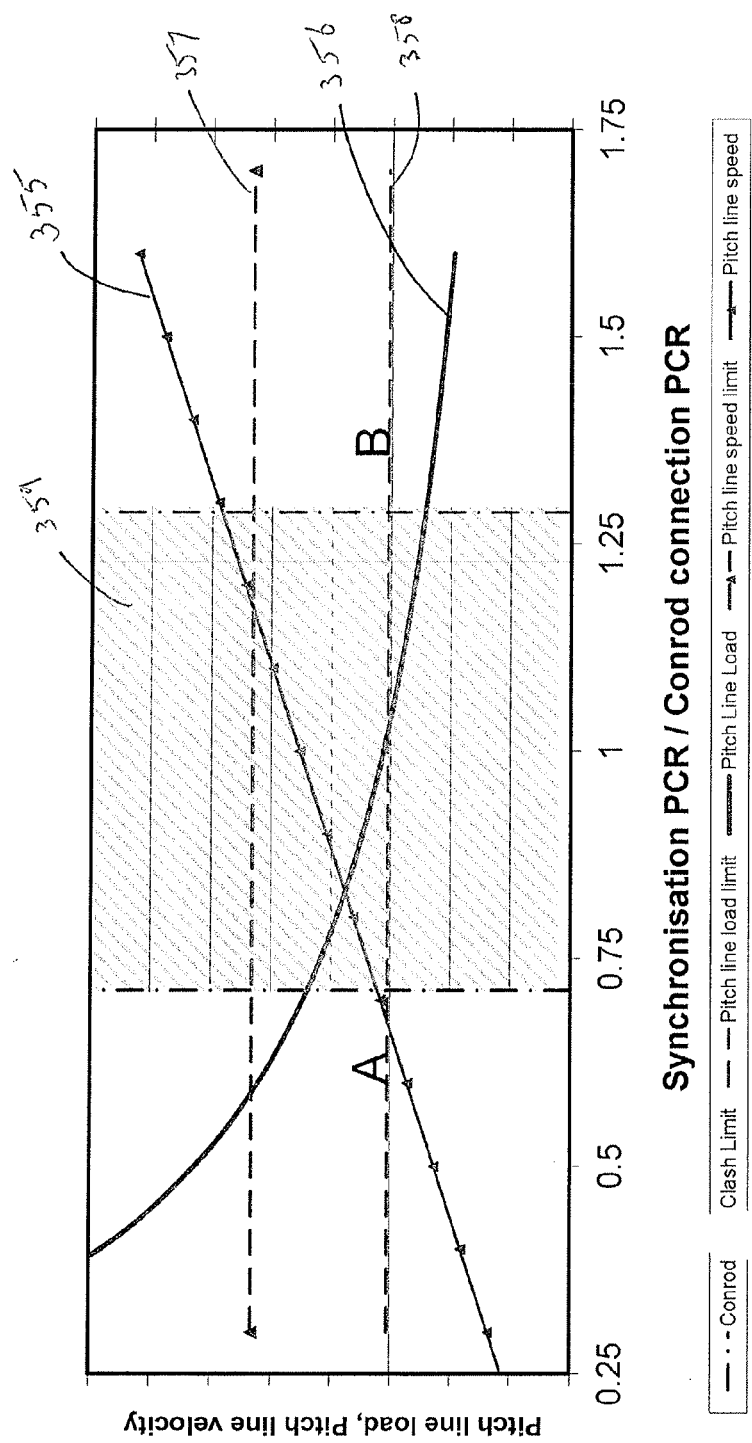
FIG. 25 is a line graph representation showing that as the Pitch Circle Radius (PCR) of a bevel gear restraint mechanism is increased, pitch line speed increases and there is a proportional decrease in the gear pitch line load.

FIG. 25 is a line graph representation showing the effect of synchronisation PCR/Conrod connection PCR. The axis across the bottom is the ratio of synchronisation PCR to Conrod connection PCR. The vertical axis is a dimensionless representation of the pitch line load and pitch line velocity. The line 355 shows the pitch line speed. The line 356 shows the pitch line load. The line 357 shows the pitch line speed limit and the line 358 shows the pitch line load limit. The hatched zone 359 shows the conrod/second member clash zone.

As the Pitch Circle Radius (PCR) of where the second member is located on the reciprocator is increased, pitch line speed increases and there is a proportional decrease in the gear pitch line load, assuming the torque applied to the gear is equivalent, in a typical internal combustion engine. For a second member PCR's substantially (<30%) less than the conrod connection PCR as represented by region A, then mechanical loads are high and reciprocator structure becomes compromised, as depicted in FIG. 20. For a second member PCR's substantially (>30%) greater than the con rod connection PCR region C, pitch line velocities are high and reciprocator mounted inertia and mass are high leading to high inertial forces on bearings and structure in a typical high speed IC engine application. Region 259 represents the area where for a second member the problems encountered at regions A and C may be alleviated or reduced or balanced. But at this region, the PCR position may not be utilised without taking into account its angular position due to concern for mechanical clash between the synchronisation restraint mechanism and the con rods. The synchronisation mechanism herein described provides the solution for design constraint.

The invention claimed is:

1. An axial piston machine acting as a thermodynamic engine, compressor, motor or pump comprising;
   a crankshaft rotatable about a crankshaft axis and carrying a crank having an inclined crank axis that is at an angle to the crankshaft axis but aligned to intersect therewith at an acute angle A at a point (point X) on the crankshaft,
   a cylinder cluster comprising at least two cylinders rigidly located with respect to each other, each cylinder spaced relative to the other(s) about a cylinder cluster axis that is coincident to said crankshaft axis, each said cylinder including at least one cylinder opening to allow fluid inlet and/or outlet to/from said cylinder controlled in a manner to allow the machine to operate as a thermodynamic engine, compressor, motor or pump,
   in each cylinder, a complementary piston to reciprocate along a reciprocating axis defined by its respective cylinder,
   a reciprocator mounted to rotate relative to said crank about said inclined crank axis, said reciprocator operatively connected to said pistons by a respective connection rod, such that the rotational motion of the crankshaft with respect to the cylinder cluster drives the reciprocal motion of the pistons within their respective cylinders or vice versa in a sinusoidal or near sinusoidal manner, and allows controlled reciprocating displacement of each piston within its respective cylinder between top dead centre (TDC) and bottom dead centre (BDC),
   a plurality of pairs of rotation constrainers operative between said cylinder cluster and said reciprocator,
   each pair of rotation constrainers comprising of:
      a. a first member mounted with or by said cylinder cluster, and
      b. a second member mounted with or by said reciprocator, and positioned to allow the first member and second member of each pair to come in and out of engagement with each other in a manner to ensure homokinetic rotational constraint between said cylinder cluster and said reciprocator at the point of engagement of each respective first and second members so that at least one pair is in operative engagement at any one time,
   wherein each pair of rotation constrainers are positioned such that:
      (a) their relative movement does not clash with adjacent connection rods nor with the reciprocator to connection rod connection, yet
      (b) each second member is positioned at a distance from point X that, if moved by rotation about said crank axis sufficiently close to a notional plane radially extending from said crank axis and on which (a) said crank axis lies and (b) passing through the reciprocator to connection rod connection, the pair of rotation constrainers would start to clash with one or both of the reciprocator to connection rod connection or the respective connection rod.

2. The machine as claimed in claim 1 wherein the number of pairs of rotation constrainers equals the number of connection rods.

3. The machine as claimed in claim 1 wherein a pair of rotation constrainers reside intermediate of each adjacent connection rods.

4. The machine as claimed in claim 1 wherein the connection rods are connected to said reciprocator at connection rod to reciprocator connections that are positioned to be at least one of (a) equispaced about the crank axis and (b) equidistant from point X.

5. The machine as claimed in claim 1 wherein said connection rod to reciprocator connections are made in or near a notional plane (herein also referred to as the equatorial plane) that is perpendicular to the crank axis and passes through point X.

6. The machine as claimed in claim 1 wherein each second member is positioned on a notional plane that radially extends from said crank axis and on which said crank axis lies and intermediate of:
   a) second notional plane that radially extends from said crank axis and on which said crank axis lies that passing through a first reciprocator to connection rod connection, and
   b) a third notional plane that radially extends from said crank axis and on which said crank axis lies that passes through a second and immediately adjacent reciprocator to connection rod connection.

7. The machine as claimed in claim 6 wherein said second member is biased in one direction between the second and third notional planes.

8. The machine as claimed in claim 1 wherein a said second member is located intermediate, and preferably midway, between the second and third notional planes.

9. The machine as claimed in claim 8 wherein said second member is located midway between said second and third notional planes.

10. The machine as claimed in claim 1 wherein said first and second members are a complementary shaped pairs where said second members each comprise of a receptacle and each said first members comprise a receptacle receivable member capable of being received by said receptacle.

11. The machine as claimed in claim 10 wherein the second member is provided with a cam profiled receptacle surface and the first member is a cam follower.

12. The machine as claimed in claim 11 wherein said cam follower comprises a contact surface that is at least partially of a shape selected from (a) cylindrical, (b) constant radiused or (c) having a variable curvature surface.

13. The machine as claimed in claim 10 wherein each receptacle receivable member comprises
a wheel
an axle mounted by said cylinder cluster and defining an axis of rotation about which said wheel can rotate said axis of rotation extending in a plane that is coincident with and in which said crankshaft axis lies.

14. The machine as claimed in claim 13 wherein said axis of rotation of the wheel is coaxial to a notional median line that is normal to a line that bisects angle A at full engagement.

15. The machine as claimed in claim 10 wherein the receptacle is of a shape and configuration to allow the receipt and exit of the receptacle receivable member.

16. The machine as claimed in claim 10 wherein the receptacle is of a shape and configuration to allow the receipt and exit of the receptacle receivable member in a manner that maintains homo kinetic rotation constraint.

17. The machine as claimed in claim 10 wherein each said receptacle comprises of two reaction surfaces over and against which a respective said receptacle receivable member can slide/roll, the receptacle receivable member making contact with a first of said surfaces as the receptacle receivable member progresses towards the median line and a second of said surfaces as the receptacle receivable member progresses away from the median line.

18. The machine as claimed in claim 10 wherein the receptacle receivable member is instantaneously nominally stationary in longitude and latitude directions of a notional sphere with it centre at point X, as it transfers from the first of said surfaces to the second of said surfaces.

19. The machine as claimed in claim 1 wherein the first members are located to be able to be received by such positioned second members when the motion of each second member is at full engagement with a respective said first member and around a point where its position is substantially stationary in a latitudinal direction) of a notional sphere with its centre at point X and stationary relative to said cylinder cluster.

20. The machine as claimed in claim 19 wherein said position of said point is also stationary in a longitudinal direction relative to the cylinder cluster.

21. The machine as claimed in claim 1 wherein the reciprocator is mounted to rotate about said crank and said cylinder cluster rotates relative to a ported member that includes at least one inlet and outlet port for each cylinder and to which each said cylinder moves into fluid communication with as said cylinder cluster rotates, appropriately timed to the position of the pistons in each cylinder between TDC and BDC by an indexing drive that maintains relative timing of the cylinder cluster with the ported member and to effect said valved control.

22. The machine as claimed in claim 21 wherein the indexing drive is any gearing arrangement that provides the appropriate ratio between the cylinder cluster and the crankshaft.

23. The machine as claimed in claim 22 wherein the drive elements are positioned to allow said first and second series to come in and out of engagement with each other in a manner to ensure effective rotation between said cylinder cluster and said ported member.

24. The machine as claimed in claim 21 wherein the indexing drive comprises two series of rotation drivers operative between said ported member and said reciprocator,
a first series mounted with or by said reciprocator and comprising N drive elements, and
a second series mounted with or by said ported member and comprising N+I or (N−I) driver elements, where I is any positive integer.

25. The machine as claimed in claim 24 wherein the first series of rotation drivers mounted to the reciprocator may comprise of N number of driver elements and the second series of rotation drivers mounted to the ported member and comprising N' driver elements, wherein the relationship between N and N' is governed by the following equations:

$N'=N\pm I$ $N=Cyl_{Number} \times I$ $Cyl_{Number}$=the number of cylinders in a cylinder cluster I=the ratio of rotation drivers to cylinders.

26. The machine as claimed in 24 wherein each drive element of said second series comprises of a receptacle and each drive element of said first series comprises a receptacle receivable member.

27. The machine as claimed in claim 24 wherein each drive element of said first series comprises:
a wheel
an axle mounted to said reciprocator and defining an axis of rotation about which said wheel can rotate said axis of rotation extending in a plane in which said crank axis lies.

28. The machine as claimed in claim 21 wherein the effective rotation of said indexing drive is of constant velocity.

29. The machine as claimed in claim 21 wherein each drive element of said second series comprises:
a wheel
an axle mounted to said ported member and defining an axis of rotation about which said wheel can rotate said axis of rotation extending in a plane in which said crankshaft axis lies.

30. A motion conversion mechanism comprising:
a primary element mounted to rotate about a primary crank axis and comprising a primary crankshaft mounted z-crank having an operational axis that intersects the primary crankshaft axis at point X at an angle A;
a stator element relative to which said primary element can rotate and comprising a plurality of engagement elements (herein after "stator elements") arranged in an annular manner about the primary axis and about the base circumference of a notional cone having a primary axis coaxial to said primary crankshaft axis and apex coincident at point X;
a nutator body mounted to the z crank to rotate freely about the operational axis, the body having a centre of nutation at point X;
a plurality of reciprocating engagement elements (herein after "nutator elements") carried by said nutator body at points:
1. on or near an equatorial plane normal to the operational axis and including point X, and
2. at an equal distance from point X, said points moving on a symmetrical or near symmetrical lemniscate locus during movement of said nutating body;
wherein said nutator elements are arranged in an annular spaced apart configuration about the base circumference of a notional cone identical in shape to that of the stator elements and having a primary axis coaxial to the operative axis and apex coincident with point X, said spaced apart configuration complementary to that of said stator elements,
wherein the stator elements and nutator elements are adapted and positioned so that at any one time during operation of the motion conversion mechanism, at least one nutator element and at least one stator element are in operative engagement with each other (the engagement point") such that the sequential reciprocation of the stator and nutator elements causes the nutator to nutate homokinetically about point x, with corresponding sequential engagement and disengagement of the stator and nutator elements, that in turn causes the primary element to rotate about the crankshaft axis at 1 rotation per nutation cycle—or vice versa wherein the engagement point is located on or about the same radial distance from point X as the radial distance from point X of the reciprocating elements.

31. motion conversion mechanism as claimed in claim 30 wherein the radial position of the engagement elements is intermediate the radial position of the reciprocating elements.

32. motion conversion mechanism as claimed in claim 30 wherein the nutator and stator elements comprise of mutually shaped compatible pairs.

33. motion conversion mechanism as claimed in claim 30 wherein each nutator element comprises of a cam follower and each said stator element comprises of a cam surface along which a said cam follower can travel.

\* \* \* \* \*